US011475355B2

United States Patent
Ie et al.

(10) Patent No.: US 11,475,355 B2
(45) Date of Patent: Oct. 18, 2022

(54) SYSTEMS AND METHODS FOR SIMULATING A COMPLEX REINFORCEMENT LEARNING ENVIRONMENT

(71) Applicant: Google LLC, Mountain View, CA (US)

(72) Inventors: Tze Way Eugene Ie, Los Altos, CA (US); Sanmit Santosh Narvekar, Arcadia, CA (US); Craig Edgar Boutilier, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 701 days.

(21) Appl. No.: 16/288,279

(22) Filed: Feb. 28, 2019

(65) Prior Publication Data

US 2020/0250575 A1 Aug. 6, 2020

Related U.S. Application Data

(60) Provisional application No. 62/801,719, filed on Feb. 6, 2019.

(51) Int. Cl.
*G06N 20/00* (2019.01)
*G06N 5/04* (2006.01)

(52) U.S. Cl.
CPC ............. *G06N 20/00* (2019.01); *G06N 5/043* (2013.01)

(58) Field of Classification Search
None
See application file for complete search history.

(56) References Cited

U.S. PATENT DOCUMENTS

2020/0241921 A1* 7/2020 Calmon ................... G06F 30/20
2020/0265302 A1* 8/2020 Sanyal .................. G06N 3/0454

OTHER PUBLICATIONS

Paternina-Arboleda CD, Montoya-Torres JR, Fabregas-Ariza A. Simulation-optimization using a reinforcement learning approach. In2008 Winter Simulation Conference Dec. 7, 2008 (pp. 1376-1383). IEEE. (Year: 2008).*
Wu Q, Wang H, Hong L, Shi Y. Returning is believing: Optimizing long-term user engagement in recommender systems. In Proceedings of the 2017 ACM on Conference on Information and Knowledge Management Nov. 6, 2017 (pp. 1927-1936). (Year: 2017).*
Wang Z, Zaman T. Learning Preferences and User Engagement Using Choice and Time Data. arXiv preprint arXiv:1608.08168. Aug. 29, 2016. (Year: 2016).*

* cited by examiner

*Primary Examiner* — Vincent Gonzales
(74) *Attorney, Agent, or Firm* — Dority & Manning, P.A.

(57) ABSTRACT

A computing system for simulating allocation of resources to a plurality of entities is disclosed. The computing system can be configured to input an entity profile that describes a preference and/or demand of a simulated entity into a reinforcement learning agent model and receive, as an output of the reinforcement learning agent model, an allocation output that describes a resource allocation for the simulated entity. The computing system can select one or more resources based on the resource allocation described by the allocation output and provide the resource(s) to an entity model that is configured to simulate a simulated response output that describes a response of the simulated entity. The computing system can receive, as an output of the entity model, the simulated response output and update a resource profile that describes the at least one resource and/or the entity profile based on the simulated response output.

20 Claims, 20 Drawing Sheets

—— CSDQN LTV
------ CSDQN MYOPIC (GAMMA = 0)
—— PERFECT GREEDY (ALWAYS SELECTS TOP K pCTR ITEMS)
------ RANDOM MULTINOMIAL PROPORTION MODEL

— CSDQN LTV
...... CSDQN MYOPIC (GAMMA = 0)
___ PERFECT GREEDY (ALWAYS SELECTS TOP K pCTR ITEMS)
---- RANDOM MULTINOMIAL PROPORTION MODEL

— CSDQN LTV
---- CSDQN MYOPIC (GAMMA = 0)
—— PERFECT GREEDY (ALWAYS SELECTS TOP K pCTR ITEMS)
---- RANDOM MULTINOMIAL PROPORTION MODEL

—— RANDOM MULTINOMIAL PROPORTION USER MODEL
----- RANDOM EXPONENTIAL CASCADE USER MODEL

— CSDQN LTV
⋯ CSDQN MYOPIC (GAMMA = 0)
— PERFECT GREEDY (ALWAYS SELECTS TOP K pCTR ITEMS)
⋯ RANDOM EXPONENTIAL CASCADE USER MODEL

— CSDQN LTV
---- CSDQN MYOPIC (GAMMA = 0)
— PERFECT GREEDY (ALWAYS SELECTS TOP K pCTR ITEMS)
---- RANDOM EXPONENTIAL CASCADE USER MODEL

— CSDQN LTV
----- CSDQN MYOPIC (GAMMA = 0)
___ PERFECT GREEDY (ALWAYS SELECTS TOP K pCTR ITEMS)
----- RANDOM MULTINOMIAL PROPORTION MODEL

SYSTEMS AND METHODS FOR SIMULATING A COMPLEX REINFORCEMENT LEARNING ENVIRONMENT

FIELD

The present disclosure relates generally to systems and methods for simulating a complex reinforcement learning environment. More particularly, the present disclosure relates to systems and methods for a simulation system that enables testing or otherwise learning various different reinforcement learning strategies or models.

BACKGROUND

A reinforcement learning agent can be trained in simulated environments using a variety of techniques. Generally, the reinforcement learning agent is given a reward based on its actions with respect to the simulated environment. The agent learns a policy over time with the aim of maximizing the reward it receives. However, real-life environments are often more complex than simulated environments currently used in reinforcement learning systems.

SUMMARY

Aspects and advantages of embodiments of the present disclosure will be set forth in part in the following description, or can be learned from the description, or can be learned through practice of the embodiments.

One example aspect of the present disclosure is directed to a computing system for simulating allocation of resources to a plurality of entities. The computing system can include one or more processors and a reinforcement learning agent model that is configured to receive an entity profile that describes at least one of a preference or a demand of a simulated entity. In response to receiving the entity profile, the reinforcement learning agent model can output an allocation output that describes a resource allocation for the simulated entity of the plurality of entities. The computing system can include an entity model configured to receive data descriptive of at least one resource, and in response to receiving the data descriptive of the at least one resource, simulate a simulated response output that describes a response of the simulated entity to the data descriptive of the at least one resource. The computing system can include one or more non-transitory computer-readable media that collectively store instructions that, when executed by the one or more processors, cause the computing system to perform operations. The operations may include inputting the entity profile into the reinforcement learning agent model; receiving, as an output of the reinforcement learning agent model, the allocation output that describes the resource allocation for the simulated entity; selecting the at least one resource to provide to the entity model based on the resource allocation described by the allocation output; providing the at least one resource to the entity model; receiving, as an output of the entity model, the simulated response output that describes the response of the simulated entity to the at least one resource; and updating at least one of a resource profile that describes the at least one resource or the entity profile based on the simulated response output.

Another example aspect of the present disclosure is directed to a method for simulating allocation of resources to a plurality of entities. The method may include inputting, by one or more computing devices, an entity profile that describes at least one of a preference or a demand of a simulated entity into a reinforcement learning agent model. The reinforcement learning agent model may be configured to receive the entity profile, and in response to receiving the entity profile, output an allocation output that describes a resource allocation for the simulated entity. The method may include receiving, by the one or more computing devices, as an output of the reinforcement learning agent model, the allocation output that describes the resource allocation for the simulated entity; selecting, by the one or more computing devices, at least one resource to simulate providing to an entity model based on the resource allocation described by the allocation output, the entity model being configured to receive data descriptive of the at least one resource, and in response to receiving the data descriptive of the at least one resource, simulate a simulated response output that describes a response of the simulated entity to the data descriptive of the at least one resource; providing, by the one or more computing devices, data descriptive of the at least one resource to an entity model; receiving, by the one or more computing devices, as an output of the entity model, the simulated response output that describes the response of the simulated entity to the at least one resource; and updating, by the one or more computing devices, at least one of a resource profile that describes the at least one resource or the entity profile based on the simulated response output.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
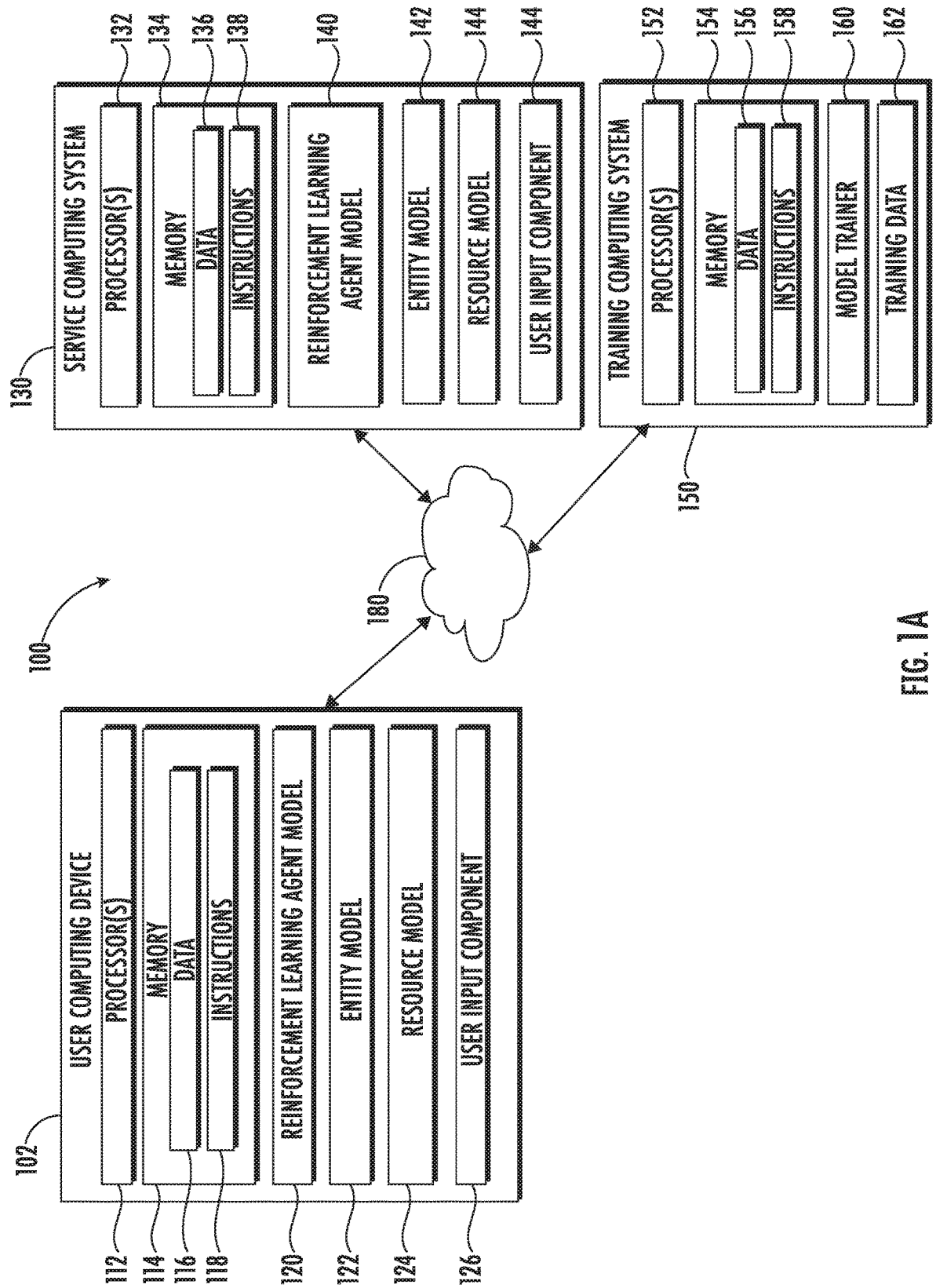
FIG. 1A depicts a block diagram of an example computing system for simulating allocation of resources to a plurality of entities using a reinforcement learning agent model according to example embodiments of the present disclosure.

Reference numerals that are repeated across plural figures are intended to identify the same features in various implementations.

DETAILED DESCRIPTION

Generally, the present disclosure is directed to systems and methods for a simulation system that enables testing or otherwise learning various different reinforcement learning strategies or models. Thus, an environment may be simulated in which policies, rules, settings, or other reinforcement learning properties can be tested before (or without) implementation in a real-world environment. As one example, the simulation system may include different components that operate to provide a simulated environment in which a reinforcement learning agent can learn to allocate resources to a plurality of entities, such as allocation of resources in an industrial setting, allocation of computing resources to competing computing tasks, and/or selection of documents or other content to provide to a user via a recommendation system. In particular, according to an aspect of the present disclosure, the systems and methods can model resource-consuming entities and/or resources that change (e.g. transition between states or conditions) over time based on their interactions with and/or outcomes observed in the simulated environment. As such, the disclosed systems and methods may be particularly useful for simulating environments that allow reinforcement learning agents to learn policies that prioritize long-term benefits at the expense of experiencing short-term negative effects in such dynamic environments. Thus, policies or other reinforcement learning properties can be simulated and/or improved before implementation in a real-life environment, in which experimentation may be too costly or impractical.

In some implementations, the systems and methods can be provided as a cloud-based service, in which users can provide a pre-trained or pre-configured reinforcement learning agent model. The users can set or adjust inputs and/or settings to customize the simulated environment, for example, to simulate a real-world environment in which the user intends to deploy the reinforcement learning agent model. The user can then simulate performance of the reinforcement learning agent model over time in the simulated environment to predict and/or optimize performance of the agent model or multiple different variants thereof in the real-world environment.

According to one aspect of the present disclosure, the computing system can include a reinforcement learning agent model and an entity model that models an entity within the simulated environment. The reinforcement learning agent model can be configured to receive at least one entity profile that describes at least one of a preference or a demand of the simulated entity (e.g., an industrial process). In response to receiving the entity profile(s), the reinforcement learning agent model can output an allocation output that describes a resource allocation for the simulated entity (e.g., an input to the industrial process, such as a raw material, fuel, setting, and/or the like). For example, according to various example configurations, the reinforcement learning agent model may apply a learned policy to generate the allocation output in an attempt to maximize a cumulative reward received by the agent model over time.

The entity model can be configured to receive data descriptive of the resource allocation generated by the reinforcement learning agent model. In response to receiving the data, the entity model can be configured to simulate a simulated response output (e.g., an updated status or performance metric of the industrial process) that describes a response of the simulated entity to the data descriptive resource allocation.

Thus, the computing system can use the entity model to simulate an environment for the reinforcement learning agent model in which one or more simulated entities respond to one or more resource allocations generated for the entities by the reinforcement learning agent model.

More specifically, the computing system can input the entity profile into the reinforcement learning agent model and receive, as an output of the reinforcement learning agent model, the allocation output that describes the resource allocation for the simulated entity. The computing system can select at least one resource to provide to the entity model based on the resource allocation described by the allocation output. The computing system can provide the resource(s) to the entity model and receive, as an output of the entity model, the simulated response output that describes the response of the simulated entity to the at least one resource.

According to an aspect of the present disclosure, the computing system can update at least one of a resource profile that describes the at least one resource or the entity profile based on the simulated response output. For example, various characteristics or states of the entity model can be updated or otherwise transitioned after simulating the entity's response to the resource allocation. Some or all of the above-described steps can be iteratively performed to simulate learning of the reinforcement learning agent model over time in the simulated environment. Additionally, updating the entity profile and/or resource profile can allow the respective states or characteristics of the entity and/or resource to change over time in the simulation to simulate dynamic entities and/or resources. Thus, the simulated environment's ability to simulate changes in the entity characteristics, behavior, or state can enable the reinforcement learning agent to learn policies that explicitly account for and are based on the fact that entities may have dynamic and varying responses to resource allocations over time and, further, that such dynamic and varying responses may be a function of the supplied resource allocations supplied to the entities over time. In such fashion, aspects of the present disclosure enable learning, in a simulated environment, reinforcement learning agents that have improved performance relative to dynamically changing resource-consuming entities.

The disclosed systems and methods can be used to simulate a variety of real-world entities and environments. As indicated above, in some implementations, the simulated entity can include an industrial process (e.g., manufacturing, power generation, etc.). The resource can include an input to the industrial process, such as a raw material, fuel, setting (e.g., temperature, processing rate, production rate), and/or the like. The simulated response output can include an updated status, change in status, or other data that describes the industrial process or change thereof in response to the receiving the resource.

As another example, the simulated entity can include a computing task or a source of the computing task. The resource can include computing resources to execute the computing task, such as a worker (e.g., a server computing device, a processing core of a processor, a physical computing device, a virtual machine, and/or the like). The simulated response output can include an updated status, change in status, or other data that describes a response or change in the computing task or source of the computing task in response to receiving the resource.

As a further example, the systems and methods disclosed herein can be used to simulate a recommender system for recommending content to human users. The simulated entities can include simulated human users. The resources can include content for viewing or engagement by the simulated human users. Example resources include text, audio, or graphical content (e.g., an image, video, article, or other media content). Such resources can be collectively referred to as "documents." The simulated response output can include engagement metrics, such as whether the document was viewed (e.g., "clicked"), interaction time, user rating, and/or the like.

In some implementations, the agent model can include a reinforcement learning agent that is learned (e.g., learns to allocate one or more resources) based on a reward that is a function of the simulated response output. The reward can be positively correlated with desirable features of the simulated response output. Examples include an output or performance metric associated with the industrial process or computing process. In another example, the reward can be positively correlated with the one or more engagement metrics that describe engagement or positive feedback of the simulated human user with respect to the resource. Similarly, the reward may be negatively correlated with negative feedback, such as a negative review or a lack of engagement with respect to the resource (e.g., if the simulated human user declines to engage).

In some implementations, the entity profile can describe a "stylized" model of the entity, in which some or all of the features of the entity have interpretable meanings. Employing features with interpretable meanings can provide insight into how a particular entity response affects the reinforcement learning agent model and/or how actions of the reinforcement learning agent model affect the entity over time. The entity profile can include or describe a demand (e.g., temperature, rate, etc.) of the industrial process and/or computing process. As another example, the entity profile can include a user profile that describes interests and/or preferences of the simulated human user.

For example, the entity profile can include one or more "interest" features. The interest features can include elements that describe affinities of the simulated human user to respective topics (e.g., sports, music, etc.). The interest features can range from a negative lower limit that represents a strong dislike of the respective topic to a positive upper limit that represents a strong like of the respective topic. Additionally, the "interest" features can vary over time (e.g., over a day, week, month, etc.). As examples, the "interest" feature corresponding with dinner recipes may be greatest near dinner time, the "interest" feature corresponding with tax preparation services may be greatest near the time of year when tax return filings are due, etc.

As another example, the entity profile can include one or more "budget" features. A budget feature can describe an amount of time available for the simulated human user to interact with the content. Resources can be provided to the simulated human user until the budget reaches a minimum threshold (e.g., zero). Then another simulated human user can be selected for simulation. However, in some implementations, resources can be provided to multiple simulated human users (or other entities) simultaneously.

In some implementations, the computing system can include a user transition model that is configured to generate an updated set of user hidden state features in response to receiving data that describes the simulated response output. The computing system can provide data that describes the simulated response output to the user transition model and update the entity profile based on the user hidden state features. Some or all of the user hidden state features can be hidden from the reinforcement learning agent. The entity profile can include user observable features that are accessible by (e.g., input into) the reinforcement learning agent. The user observable features can be updated based on the user hidden state features. As such, some information about the entity may not be immediately discoverable by the reinforcement learning agent. The reinforcement learning agent can be trained to select resources to provide to the entity such that information about the entity can be discovered during the simulation. Thus, the reinforcement learning agent can be trained to balance exploitation and exploration regarding information about the entities in a "multi-armed bandit" context.

In some implementations, the computing system can include a resource model that is configured to receive data descriptive of a plurality of resources, and in response to receiving the data descriptive of the plurality of resources, output resource observable features. The reinforcement learning agent model can be trained to select the allocation output based, at least in part, on the resource observable features. The resource observable features can describe the resource and be assessable (e.g., input into) the reinforcement learning agent model. More specifically, the computing system can input the data descriptive of the plurality of resources into the resource model, and receive, as an output of the resource model, resource observable features. The computing system can input the resource observable features into the reinforcement learning agent model. The resource profile can also include hidden features that are not assessable (e.g., input into) the reinforcement learning agent model. Thus, the reinforcement learning agent can be trained to balance exploitation and exploration regarding information about the resources in a "multi-armed bandit" context.

The features (e.g., observable and/or hidden features) of the resource profile can describe the resource. As one example, in the recommender system application, the resource profile can include one or more "properties" features respectively including one or more elements that describe the subject matter of the document. The "properties" feature(s) can include elements corresponding with respective topics. The elements can range from a minimum value to a maximum value to indicate the relevance of the document with the respective topic.

As another example, the resource profile can include a "length" feature. The length feature can describe a length of time associated with engaging with the document. For instance, the length feature can describe the length of a video.

As a further example, the resource profile can include a "quality" feature. The "quality feature" can describe the extent to which the document includes quality content, as opposed to content that appears interesting at first but does not provide meaningful or relevant information on further engagement (e.g., "clickbait"). The "quality" feature can describe more objective measures of quality, such as the video quality of a video, writing quality of an article, and/or the like.

In some implementations, the computing system can simulate providing a plurality of resources to the simulated entity from which the simulated entity can "choose" resources to engage or consume (or whether to decline to engaging with all resources presented). More specifically, the simulated response output can include a selection of fewer than all of the resources provided to the simulated entity. For example, in the recommender system example, the reinforcement learning agent can select a plurality of documents (e.g., videos, articles, images, advertisements etc.) and provide the documents to the simulated human user in a "slate." The "slate" can include a collection (e.g., list of titles or descriptions, thumbnails of images, previews of videos, etc.) of recommended documents for viewing or otherwise engaging. In such implementations, the simulated response output can describe a selection of fewer than all of the plurality of resource items by the entity. For instance, the simulated human user can select one document from the plurality of documents presented in the slate. However, the simulated human user can decline to select any of the documents presented.

For example, the entity model can include a discrete choice model. Discrete choice models are generally configured to select one item from a finite group of items. The discrete choice model can be configured to select one resource from a plurality of resources (e.g., the slate of documents). The discrete choice model can employ a variety of suitable functions, including a multinomial proportion function, multinomial logit function, an exponential cascade function, and/or the like. However, in some implementations, the entity model can decline to select any resources from the plurality of resources.

Additionally, it should be understood that aspects of the present disclosure may find application outside of the reinforcement learning context described herein. For example, non-sequential models may be employed.

The systems and methods of the present disclosure define a specific technical implementation for simulating the allocation of resources to a plurality of entities. Implementation of the described techniques thus provides a technical function, allowing virtual trials which are a practical and practice-oriented part of the skilled engineer's toolkit. Moreover the systems and methods of the present disclosure provide a number of additional technical effects and benefits. As one example, the systems and methods described herein can aid in development and/or optimization of reinforcement learning agents for controlling industrial processes, such as power generation. Increased efficiency controlling and/or monitoring such processes can reduce waste and save energy.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

With reference now to the Figures, example embodiments of the present disclosure will be discussed in further detail.

Example Devices and Systems

FIG. 1A depicts a block diagram of an example computing system 100 for simulating a reinforcement learning environment according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more reinforcement learning agent models 120, entity models 122, and/or resource models 124. For example, the reinforcement learning agent models 120, entity models 122, and/or resource models 124 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. Example reinforcement learning agent models 120 are discussed with reference to FIGS. 2 through 5.

In some implementations, the one or more reinforcement learning agent models 120 can be received from the server computing system 130 over network 180, stored in the user computing device memory 114, and the used or otherwise implemented by the one or more processors 112. In some implementations, the user computing device 102 can implement multiple parallel instances of a single reinforcement learning agent models.

Additionally or alternatively, one or more reinforcement learning agent models 140, entity models 142, and/or resource models 144 can be included in or otherwise stored and implemented by the server computing system 130 that communicates with the user computing device 102 according to a client-server relationship. For example, the reinforcement learning agent models 140, entity models 142, and/or resource models 144 can be implemented by the server computing system 140 as a portion of a web service (e.g., a reinforcement learning simulation service). Thus, one or more models 120, 122, 124 can be stored and implemented at the user computing device 102 and/or one or more models 140, 142, 144 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more reinforcement learning agent models 140, entity models 142, and/or resource models 144. For example, the models 140 can be or can otherwise include various machine-learned models such as neural networks (e.g., deep recurrent neural networks) or other multi-layer non-linear models. Example models 140, 142, 144 are discussed with reference to FIGS. 2 through 5.

In some implementations, the systems and methods can be provided as a cloud-based service (e.g., by the server computing system 130). Users can provide a pre-trained or pre-configured reinforcement learning agent model. The users can set or adjust inputs and/or setting to customize the simulated environment, for example to simulate a real-world environment in which the user intends to deploy the reinforcement learning agent model. The user can then simulate performance of the reinforcement learning agent model over time in the simulated environment to predict and/or optimize performance of the agent model or multiple different variants thereof in the real-world environment.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140, 142, 144 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train or pre-train reinforcement learning agent models 140, entity models 142, and/or resource models 144 based on training data 142. The training data 142 can include labeled and/or unlabeled data. For instance, the training data 142 can include resource allocation data associated with a real-life environment (e.g., an industrial process, a recommender system, etc.)

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
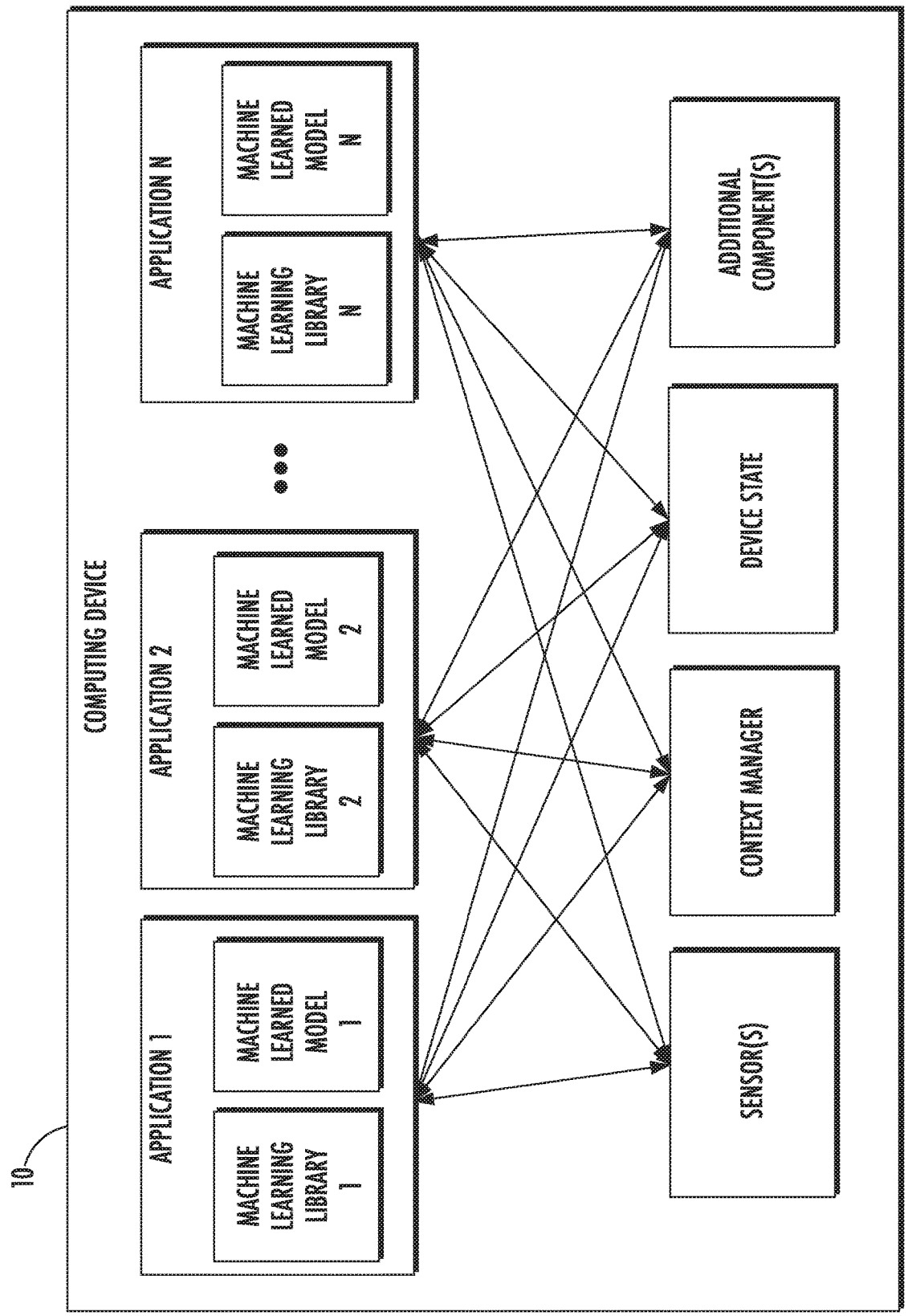
FIG. 1B depicts a block diagram of an example computing device for simulating allocation of resources to a plurality of entities using a reinforcement learning agent model according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
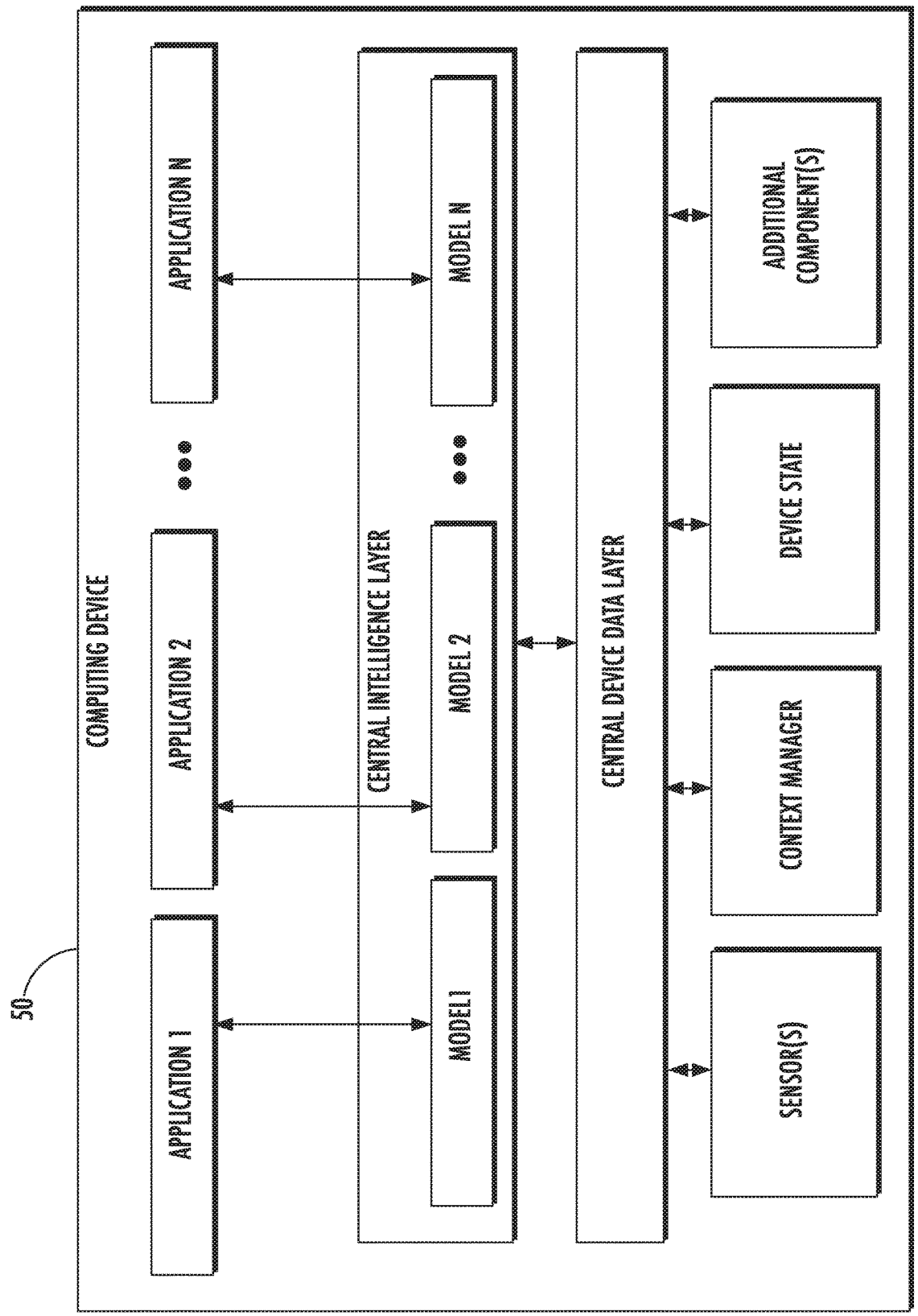
FIG. 1C depicts a block diagram of an example computing device for simulating allocation of resources to a plurality of entities using a reinforcement learning agent model according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
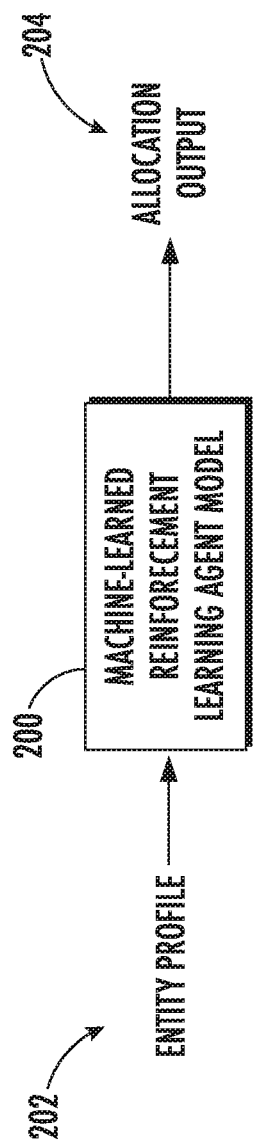
FIG. 2 depicts a machine-learned reinforcement learning agent model according to example embodiments of the present disclosure.

FIG. 2 depicts a block diagram of an example reinforcement learning model 200 according to example embodiments of the present disclosure. In some implementations, the reinforcement learning model 200 is trained to receive an entity profile 202 that describes at least one of a preference or a demand of a simulated entity (e.g., an industrial process). In response to receiving the entity profile 202, provide allocation output 204 that that describes a resource allocation for the simulated entity (e.g., an input to the industrial process, such as a raw material, fuel, setting, and/or the like). For example, according to various example configurations, the reinforcement learning agent model 200 may apply a learned policy to generate the allocation output 204 in an attempt to maximize a cumulative reward received by the agent model over time.

Figure 3:
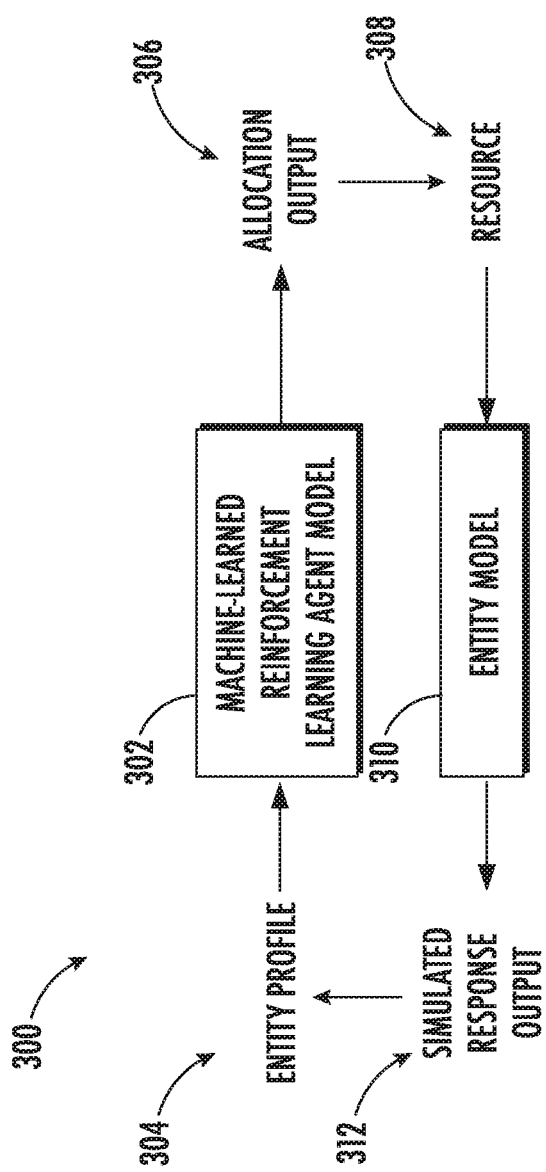
FIG. 3 depicts an embodiment of a system for simulating allocation of resources to a plurality of entities according to example embodiments of the present disclosure.

FIG. 3 depicts a block diagram of an example reinforcement learning simulation system 300 according to example embodiments of the present disclosure. The reinforcement learning simulation system 300 may include a reinforcement learning agent model 302, for example as described above with reference to FIG. 2.

The reinforcement learning simulation system 300 may select at least one resource 308 to provide to an entity model 310 based on the resource allocation described by the allocation output 306. The entity model 308 may be configured to receive data descriptive of the resource(s) 308, and in response to receiving the data descriptive of the resource(s) 308, simulate a simulated response output 312 that describes a response of the simulated entity to the data descriptive of the at least one resource 308.

The reinforcement learning simulation system 300 may update the at least one of a resource profile that describes the at least one resource or the entity profile 304 based on the simulated response output 312.

Thus, the reinforcement learning simulation system 300 can use the entity model 310 to simulate an environment for the reinforcement learning agent model 302 in which one or more simulated entities respond to one or more resource allocations generated for the entities by the reinforcement learning agent model 302.

More specifically, the computing system can input the entity profile 304 into the reinforcement learning agent model 302 and receive, as an output of the reinforcement learning agent model 302, the allocation output 306 that describes the resource allocation for the simulated entity. The computing system can select at least one resource 308 to provide to the entity model 310 based on the resource allocation described by the allocation output 306. The computing system can provide the resource(s) 308 to the entity model 310 and receive, as an output of the entity model, the simulated response output 310 that describes the response of the simulated entity to the at least one resource 308.

According to an aspect of the present disclosure, the computing system can update at least one of a resource profile that describes the at least one resource or the entity profile 304 based on the simulated response output 312. For example, various characteristics or states of the entity model 310 can be updated or otherwise transitioned after simulating the entity's response to the resource allocation. Some or all of the above-described steps can be iteratively performed to simulate learning of the reinforcement learning agent model 302 over time in the simulated environment. Additionally, updating the entity profile 304 and/or resource profile can allow the respective states or characteristics of the entity and/or resource to change over time in the simulation to simulate dynamic entities and/or resources. Thus, the simulated environment's ability to simulate changes in the entity characteristics, behavior, or state can enable the reinforcement learning agent to learn policies that explicitly account for and are based on the fact that entities may have dynamic and varying responses to resource allocations over time and, further, that such dynamic and varying responses may be a function of the supplied resource allocations supplied to the entities over time. In such fashion, aspects of the present disclosure enable learning, in a simulated environment, reinforcement learning agents that have improved performance relative to dynamically changing resource-consuming entities.

The disclosed systems and methods can be used to simulate a variety of real-world entities and environments. As indicated above, in some implementations, the simulated entity can include an industrial process (e.g., manufacturing, power generation, etc.). The resource 308 can include an input to the industrial process, such as a raw material, fuel, setting (e.g., temperature, processing rate, production rate), and/or the like. The simulated response output 312 can include an updated status, change in status, or other data that describes the industrial process or change thereof in response to the receiving the resource.

As another example, the simulated entity can include a computing task or a source of the computing task. The resource 308 can include computing resources to execute the computing task, such as a worker (e.g., a server computing device, a processing core of a processor, a physical computing device, a virtual machine, and/or the like). The simulated response output 312 can include an updated status, change in status, or other data that describes a response or change in the computing task or source of the computing task in response to receiving the resource.

Figure 4:
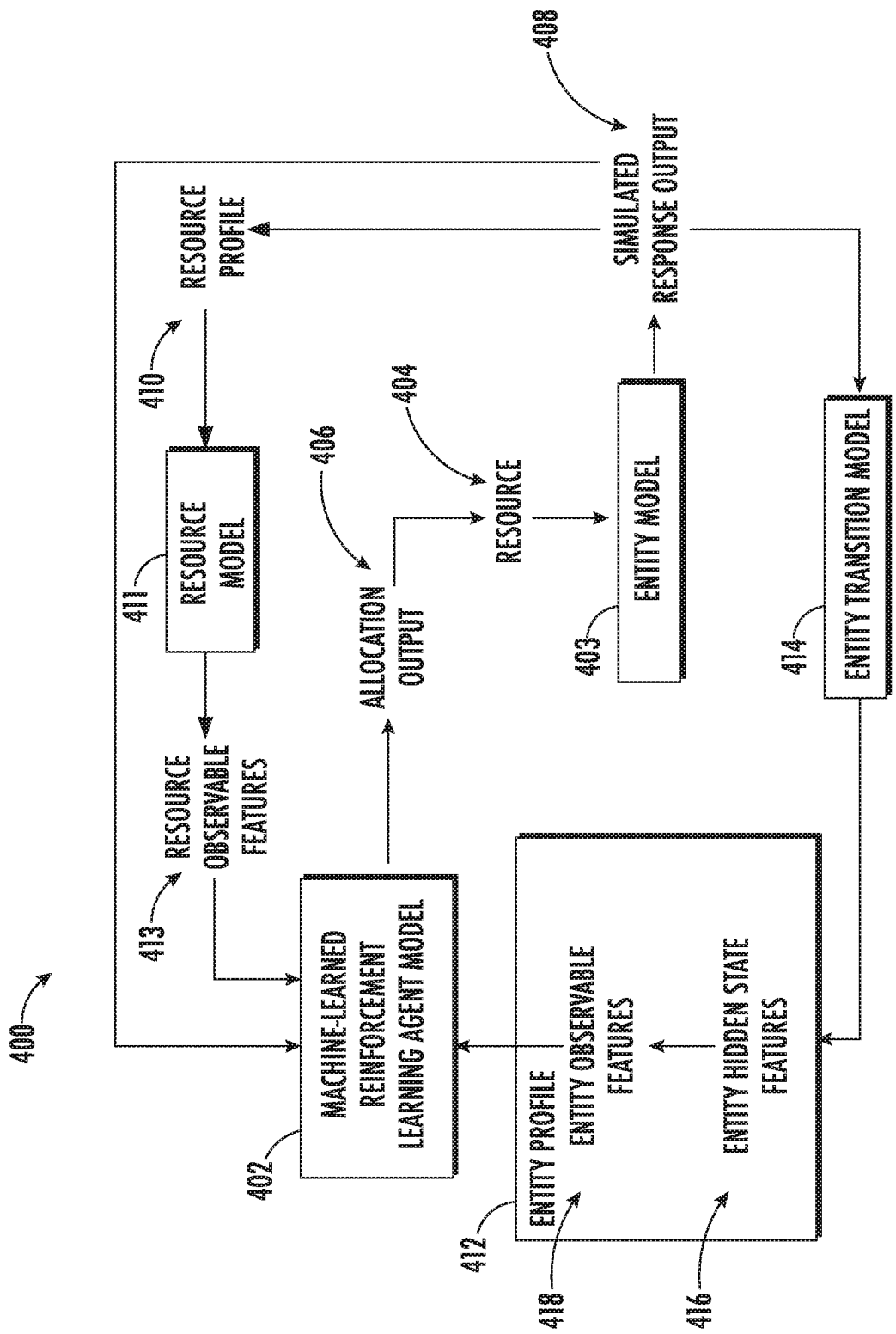
FIG. 4 depicts another embodiment of a system for simulating allocation of resources to a plurality of entities according to example embodiments of the present disclosure.

FIG. 4 depicts a block diagram of an example reinforcement learning simulation system 400 according to example embodiments of the present disclosure. The reinforcement learning simulation system 400 may include a reinforcement learning agent model 402 and entity model 403, for example as described above with reference to FIGS. 2 and 3.

The reinforcement learning simulation system 400 may select at least one resource 404 to provide to the entity model 403 based on the resource allocation described by the allocation output 406 output by the reinforcement learning agent model 402. The entity model 403 may be configured to receive data descriptive of the resource(s) 404, and in response to receiving the data descriptive of the resource(s) 404, simulate a simulated response output 408 that describes a response of the simulated entity to the data descriptive of the at least one resource 404.

According to an aspect of the present disclosure, the computing system can update a resource profile 410 that describes the at least one resource and/or the entity profile 412 based on the simulated response output 408 (e.g., using an entity transition model 414). For example, various characteristics or states of the entity model 403 can be updated or otherwise transitioned after simulating the entity's response to the resource allocation. The computing system can update a resource profile 410 that describes the resource 404 or the entity profile 412 based on the simulated response output 408. For example, the system 400 can include a resource model 411 that is configured to receive data descriptive of a plurality of resources including the at least one resource (e.g., including the resource profile 410). The resource model 411 can be configured to output resource observable features 413 in response to receiving the data descriptive of the plurality of resources (e.g., the resource profile 410). The reinforcement learning agent model 402 can be trained to select the allocation output 406 based, at least in part, on the resource observable features 413. Thus, the computing system can simulate an environment in which characteristics of the resources change over time.

In some implementations, the reinforcement learning simulation system 400 can include an entity transition model 414 that is configured to generate an updated set of entity hidden state features 416 in response to receiving data that describes the simulated response output 408. The computing system can provide data that describes the simulated response output 408 to the entity transition model 414 and update the entity profile 412 based on the entity hidden state features 416. For example, the entity profile 412 can include the entity hidden state features 416. Some or all of the entity hidden state features 416 can be hidden from the reinforcement learning agent model 402. The entity profile 412 can include entity observable features 418 that are accessible by (e.g., input into) the reinforcement learning agent model 402. The entity observable features 418 can be updated based on the entity hidden state features 416. As such, some information about the entity may not be immediately discoverable by the reinforcement learning agent model 402. The reinforcement learning agent model 402 can be trained to select resources to provide to the entity such that information about the entity can be discovered during the simulation. Thus, the reinforcement learning agent can be trained to balance exploitation and exploration regarding information about the entities in a "multi-armed bandit" context.

In some implementations, the agent model 402 can include a reinforcement learning agent that is learned based on a reward that is a function of the simulated response output 408. The reward can be positively correlated with desirable features of the simulated response output 408. Examples include an output or performance metric associated with the industrial process or computing process. In another example, the reward can be positively correlated with the one or more engagement metrics that describe engagement or positive feedback of the simulated human user with respect to the resource.

In some implementations, the entity profile 412 can describe a "stylized" model of the entity, in which some or all of the features of the entity have interpretable meanings. Employing features with interpretable meanings can provide insight into how a particular entity response 408 affects the reinforcement learning agent model 402 and/or how actions of the reinforcement learning agent model 402 affect the entity (e.g., as described by the entity profile 412) over time. For example, the entity profile 412 can include or describe a demand (e.g., temperature, rate, etc.) of the industrial process and/or computing process. As another example, the entity profile 412 can include a user profile that describes interests and/or preferences of the simulated human user.

Thus, the computing system can use the entity model 403, resource model 411, and/or entity transition model 414 to simulate an environment for the reinforcement learning agent model 402 in which one or more simulated entities respond to one or more resource allocations generated for the entities by the reinforcement learning agent model 402. Additionally, the system can model resource-consuming entities and/or resources that transition over time based on their interactions with and/or outcomes observed in the simulated environment. For example, updating the entity profile 412 and/or resource profile 410 can allow the respective states or characteristics of the entity and/or resource to change over time in the simulation to simulate dynamic entities and/or resources.

Figure 5A:
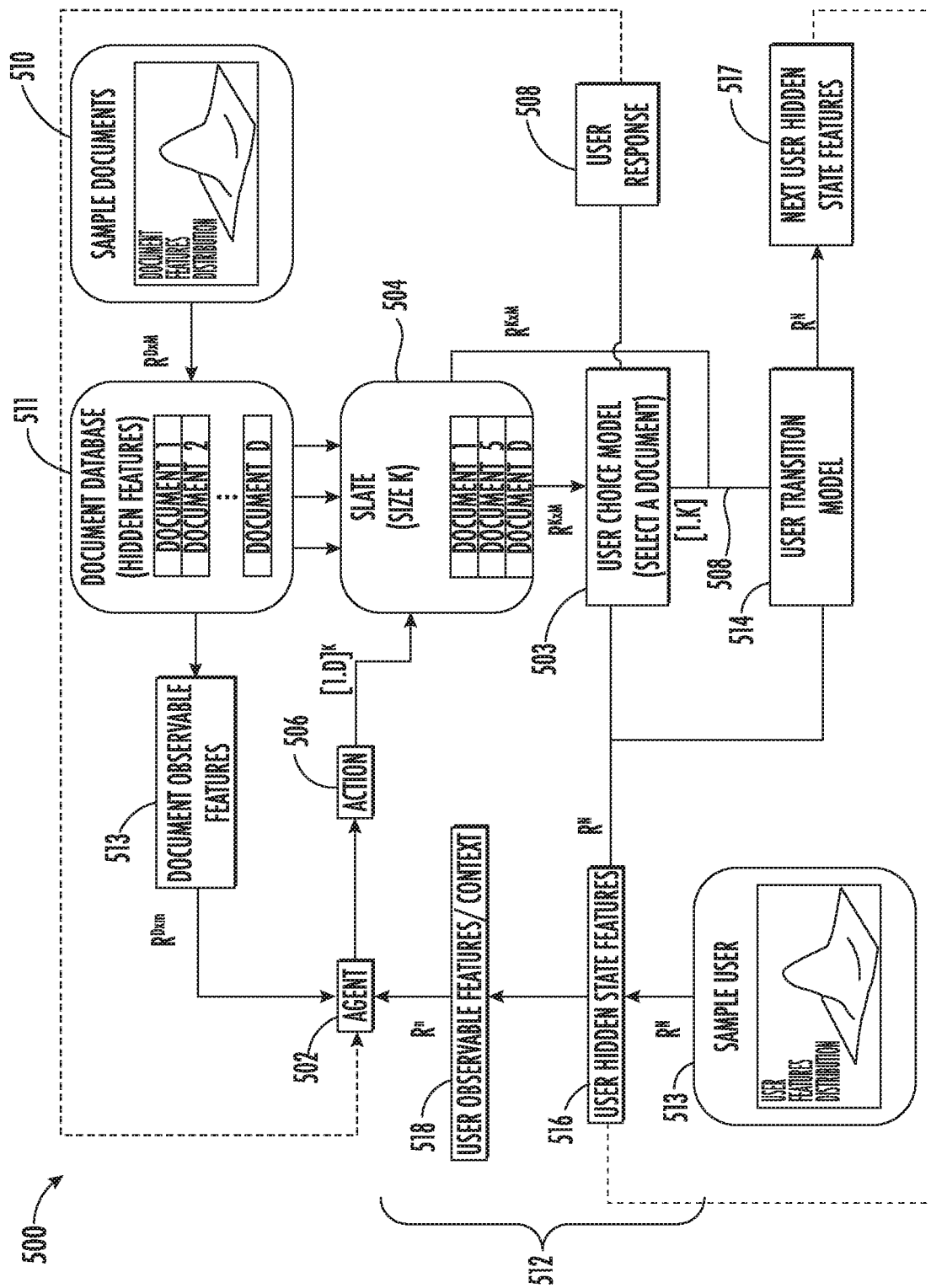
FIG. 5A depicts an embodiment of a system for simulating a recommender system according to example embodiments of the present disclosure.

FIG. 5A depicts a block diagram of a system 500 for simulating a recommender system for recommending content to human users according to aspects of the present disclosure. The simulated entities can include simulated human users. The resources can include content for viewing or engagement by the simulated human users. Example resources include text, audio, or graphical content (e.g., an image, video, article, or other media content). Such resources can be collectively referred to as "documents." Although the system 500 is described below with reference to "simulated human users" and "documents," it should be understood that aspects of the system 500 may be employed in other contexts, including industrial processes and/or computing processes.

Certain elements of the system 400 described above with reference to FIG. 4 may correspond with elements of the system 500 of FIG. 5. For example, the simulated response output 408 of FIG. 4 can correspond with a simulated user response 508 of FIG. 5. The user response 508 can include engagement metrics, such as whether the document was viewed (e.g., "clicked"), interaction time, user rating, and/or the like.

In some implementations, the agent model 502 can include a reinforcement learning agent that is learned (e.g., learns to allocate one or more resources) based on a reward that is a function of the simulated response output (e.g., the simulated user response 508). The reward can be positively correlated with desirable features of the simulated response output (e.g., the simulated user response 508). For example, the reward can be positively correlated with the one or more engagement metrics that describe engagement or positive feedback of the simulated human user with respect to the resource.

In some implementations, the user profile 512 can describe a "stylized" model of the simulated human user, in which some or all of the features of the simulated human user have interpretable meanings. Employing features with interpretable meanings can provide insight into how a particular simulated user response 508 affects the reinforcement learning agent model 502 and/or how actions of the reinforcement learning agent model 502 affect the simulated human user (e.g., the user profile 512) over time. The user profile 512 can describe interests and/or preferences of the simulated human user.

The user profile 512 can include user observable features and/or context 518, user hidden state features 516, and/or a base user profile 513 that can initially describe the user hidden state features 516 before any updating has occurred. A user transition model 514 can be configured to receive the user hidden state features 516 from the user profile 512, receive the simulated user response 508 from the user choice model 503, and/or receive the resource 504 (e.g., slate of documents) from the document model 511. In response, the user transition model 514 can be configured to output the next user hidden state features 517. The system 500 can then update the existing user hidden state features 516 with the next user hidden state features 517. Some or all of the user hidden state features 516 can be hidden from the reinforcement learning agent 502. The user observable features 518 can be accessible by (e.g., input into) the reinforcement learning agent 502. The user observable features 518 can be updated based on the user hidden state features 516. As such, some information about the user may not be immediately discoverable by the reinforcement learning agent 502. The reinforcement learning agent 502 can be trained to select resources 504 (e.g., select documents for inclusion in the slate) to provide to the simulated human user such that information about the simulated human user can be discovered during the simulation. Thus, the reinforcement learning agent 502 can be trained to balance exploitation and exploration regarding information about the simulated human users in a "multi-armed bandit" context.

Thus, the computing system can use the user choice model 503, document model 511, and/or user transition model 514 to simulate an environment for the reinforcement learning agent model 502 in which one or more simulated human users respond to one or more resources (e.g., documents) selected for presentation to the simulated human users by the reinforcement learning agent model 502. Additionally, the system can model resource-consuming simulated human users and/or documents that transition over time based on their interactions with and/or outcomes observed in the simulated environment. For example, updating the user profile 512 and/or resource profile 510 can allow the respective states or characteristics of the simulated human user and/or resource to change over time in the simulation to simulate dynamic human users and/or resources.

The user profile 512 can include a variety of information about the simulated human user. For example, the user profile 512 can include one or more "interest" features. The interest features can include elements that describe affinities of the simulated human user to respective topics (e.g., sports, music, etc.). The interest features can range from a negative lower limit that represents a strong dislike of the respective topic to a positive upper limit that represents a strong like of the respective topic.

As another example, the user profile 512 can include one or more "budget" features. A budget feature can describe an amount of time available for the simulated human user to interact with the document (e.g., to view videos). Documents can be provided to the simulated human user until the budget reaches a minimum threshold (e.g., zero). Then another simulated human user can be selected for simulation. However, in some implementations, resources can be provided to multiple simulated human users (or other entities) simultaneously.

Additional examples of features that may be included in the user profile 512 include user patience, user attention, user preference for receiving new material (e.g., "novelty seeking"), and degree of satisfaction and/or annoyance, etc.

As indicated above, the user transition model 514 can update the user state based on the slate 504 presented and the item(s) selected as indicated in the simulated human user response 508.

Interest Update

Interests can be updated only with respect to documents that the simulated user engages (e.g., clicks, watches):

$$\text{target}(u,d) = \text{Properties}_d - \text{Interests}_u$$

The above update can be scaled using the following update affinity function, where y represents a maximum fraction of update possible, and x represents a maximum point at which the update should be 0.

$$\alpha_i = -\frac{y}{x}|\text{Interests}_u| + y$$

Figure 5B:
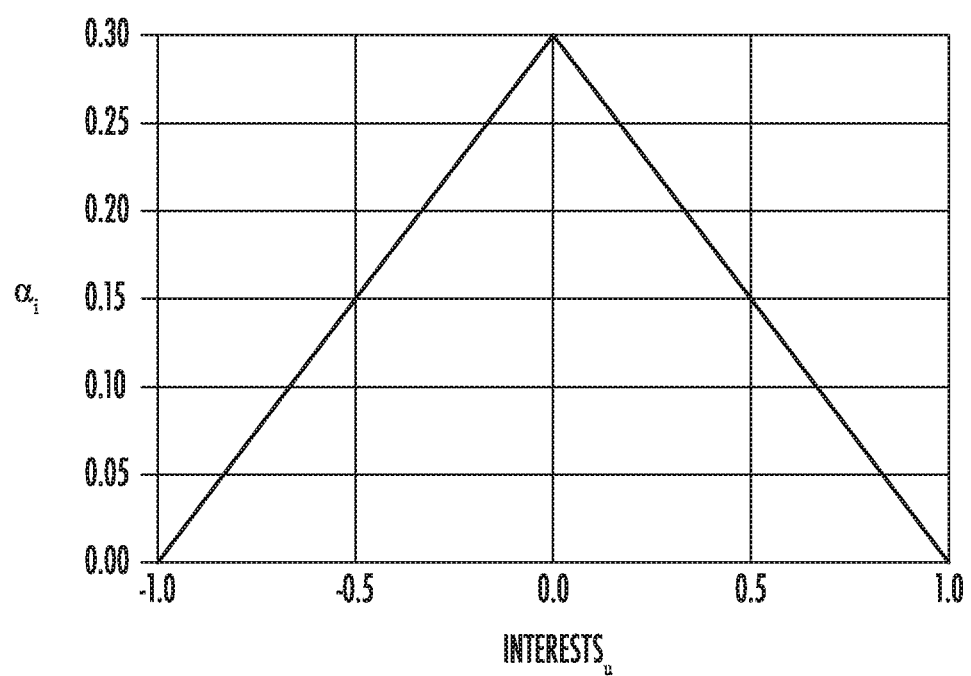
FIG. 5B illustrates a sample graph an example update affinity function for a user transition model of the system of FIG. 5A according to example embodiments of the present disclosure.

FIG. 5B illustrates a sample graph of $\alpha_i$ for x=1 and y=0.3 for the update affinity function for the user transition model 514. The update can be larger for interests that are neutral and smaller for interests that are more defined.

A mask can be applied so that only interests related to (e.g., matching) properties of the document are updated. For example, Properties can be a 1 hot vector encoding.

$$\text{mask}=\text{Properties}_d$$

The update can be allowed to be either positive or negative with some probability based on the simulated user's interest with the document, F(u, d). Thus, the final update rule can be expressed as follows:

$$\text{Interests}_u \leftarrow \begin{cases} \text{Interests}_u + \text{mask} \cdot \alpha_i \cdot \text{target}(u, d) & \text{with probability } (F(u, d) + 1)/2 \\ \text{Interests}_u + \text{mask} \cdot \alpha_i \cdot \text{target}(u, d) & \text{otherwise} \end{cases}$$

In some implementations, the computing system can include a document model 511 that is configured to receive data descriptive of a plurality of resources, and in response to receiving the data descriptive of the plurality of resources (e.g., including the document profile(s) 510), the document model 511 can be configured to output document observable features 513. The reinforcement learning agent model 502 can be trained to output the allocation output 506 based, at least in part, on the document observable features 513. The document observable features 513 can describe the document(s) and can be assessable (e.g., input into) the reinforcement learning agent model 502. More specifically, the computing system can input the data descriptive of the plurality of resources (e.g., the document profile(s) 510) into the document model 511, and receive, as an output of the document model 511, document observable features 513. The computing system can input the document observable features 513 into the reinforcement learning agent model 502. The document profile 510 can also include hidden features that are not assessable (e.g., input into) the reinforcement learning agent model 502. Thus, the reinforcement learning agent 502 can be trained to balance exploitation and exploration regarding information about the documents in a "multi-armed bandit" context.

The features (e.g., observable and/or hidden features) of the document profile can describe the document. As one example, the document profile 510 and/or document observable features 513 can include a "properties" feature that includes one or more elements that describe the subject matter of the document. The "properties" feature can include elements corresponding with respective topics. The elements can range from a minimum value to a maximum value to indicate the relevance of the document with the respective topic.

As another example, the document profile 510 and/or document observable features 513 can include a "length" feature. The length feature can describe a length of time associated with engaging with the document. For instance, the length feature can describe the length of a video.

As a further example, the document profile 510 and/or document observable features 513 can include a "quality" feature. The "quality feature" can describe the extent to which the document includes quality content, as opposed to content that appears interesting at first but does not provide meaningful or relevant information on further engagement (e.g., "clickbait"). The "quality" feature can describe more objective measures of quality, such as the video quality of a video, writing quality of an article, and/or the like.

In some implementations, the computing system can simulate providing a plurality of documents 504 (e.g., a "slate" of documents) to the simulated human users from which the simulated human users can "choose" resources to engage or consume. More specifically, the simulated user response output 508 can include a selection of fewer than all of the documents provided to the simulated human user. For example, the reinforcement learning agent 502 can select a plurality of videos, articles, images, advertisements etc. and provide the documents to the simulated human user in the slate 504. The slate 504 can include a list of recommended documents for viewing or otherwise engaging. In such implementations, the simulated user response output 508 can describe a selection of fewer than all of the plurality of documents in the slate 504 by the simulated human user. For instance, the simulated human user can select one document from the plurality of documents presented in the slate.

For example, the user choice model 503 can include a discrete choice model. Discrete choice models are generally configured to select one item from a finite group of items. The discrete choice model can be configured to select one document from the plurality of documents 504 (e.g., slate). The discrete choice model can employ a variety of suitable functions, including a multinomial proportion function, multinomial logit function, an exponential cascade function, and/or the like.

The discrete choice model can calculate un-normalized scores F(u, d) as a dot product between user interests, $\text{Interests}_u$, and document properties, $\text{Properties}_d$:

$$F(u,d) = \text{Interests}_u \cdot \text{Properties}_d$$

Given a vector of un-normalized scores F for different documents provided to a simulated human user, the user choice model 503 can sample/select a document according to a "probability function" of the choice model 503. Example probability functions include a multinomial proportion function, a multinomial logit function, and an exponential cascade function.

Multinomial Proportion

This model computes the probability of selecting document d in a slate as:

$$P_{mp}(u, d) = \frac{F(u, d)}{\sum_{d \in slate} F(u, d)}$$

Since F(u, d) can be negative, the scores can be shifted by a minimum possible score (in the example shown here, it is −1) to ensure valid probabilities. In addition, a "no click" score can be added to F to account for an outcome where no items are selected.

Multinomial Logit

A multinomial logit model can compute the probability of selecting document, d, in a slate as:

$$p_{ml}(u, d) = \frac{\exp(F(u, d))}{\sum_{d \in slate} \exp(F(u, d))}$$

With this model, additional shifting is generally not required. The same "no click" score can be used to simulate no selections.

Exponential Cascade

Both the Multinomial Proportion and Multinomial Log it models generally do not account for the position of items in the slate when assigning scores. In contrast, an exponential cascade model assumes "attention" is given to one item at a time, with exponentially decreasing attention given to items farther down in the slate. The exponential cascade model also assumes that each item has a base probability P(u,d) of selection with full attention. The chance for an item at position, i, to be clicked can be calculated as:

$$p(u,d)_i = \beta_0 \beta^i p(u,d) \text{ for } i=0,1,2,\ldots \text{slate\_size}$$

in which $\beta_0$ represents a base probability of selection; $\beta_i$ represents a decay factor; and slate_size represents a number of documents in the slate. P(u, d) can represent a probability that the item would be selected without accounting for position (e.g. using one of the two models described above). Items can be considered in order from i=0 to slate_size. Once an item is selected, the process can be terminated. The conditional state deep q network (CSDQN) algorithm as described herein assumes that the choice model is the Multinomial Proportion type.

Budget Update

The budget update takes a utility perspective. We assume that the simulated human user selects documents according to the utility they expect to receive, Utility$_e$.

$$\text{Utility}_e(d) = F(u,d)$$

However, the utility that the simulated human user actually receives, Utility$_r$, is a weighted sum of their expected utility, Utility$_e$, and the document quality:

$$\text{Utility}_r(d) = \theta_e \cdot \text{Utility}_e(d) + \theta_d \cdot \text{Utility}_d$$

The results below assign all the mass to document quality to show a larger gap, but using a smaller amount also works. The budget is updated based on the utility received and the length of the video. If a simulated human user "watches" a video, the budget is updated as:

$$\text{Budget}_u \leftarrow \text{Budget}_u - \text{VideoLength}(d) + \alpha_b \cdot \text{VideoLength}(d) \cdot \text{Utility}_r(d)$$

in which $\alpha_b$ is a fraction of the video length to extend the session by, multiplied by a normalizing constant to scale Utility$_r$ to be between [−1,1]. Thus, when the simulated user watches higher quality videos, the simulated human user is willing to extend their session longer, whereas showing low quality content results in a shorter session.

If a video is not clicked, there is a constant step penalty (0.5 time units in our case) is applied:

$$\text{Budget}_u \leftarrow \text{Budget}_u - \kappa$$

Response Model

The simulated human user provides a response for each element on the slate. There are currently two response variables:

1. "Clicked": whether the document was clicked or not; and
2. "Watch Time": the length of time that the simulated human user watched the document.

For this experiment, we assume videos that are clicked are completely consumed or viewed. The agents are trained to optimize the total watch time over a session.

The systems and methods of the present disclosure define a specific technical implementation for simulating the allocation of resources to a plurality of entities. Implementation of the described techniques thus provides a technical function, allowing virtual trials which are a practical and practice-oriented part of the skilled engineer's toolkit. Moreover the systems and methods of the present disclosure provide a number of additional technical effects and benefits. As one example, the systems and methods described herein can aid in development and/or optimization of reinforcement learning agents for controlling industrial processes, such as power generation. Increased efficiency controlling and/or monitoring such processes can reduce waste and save energy.

Example Methods

Figure 6:
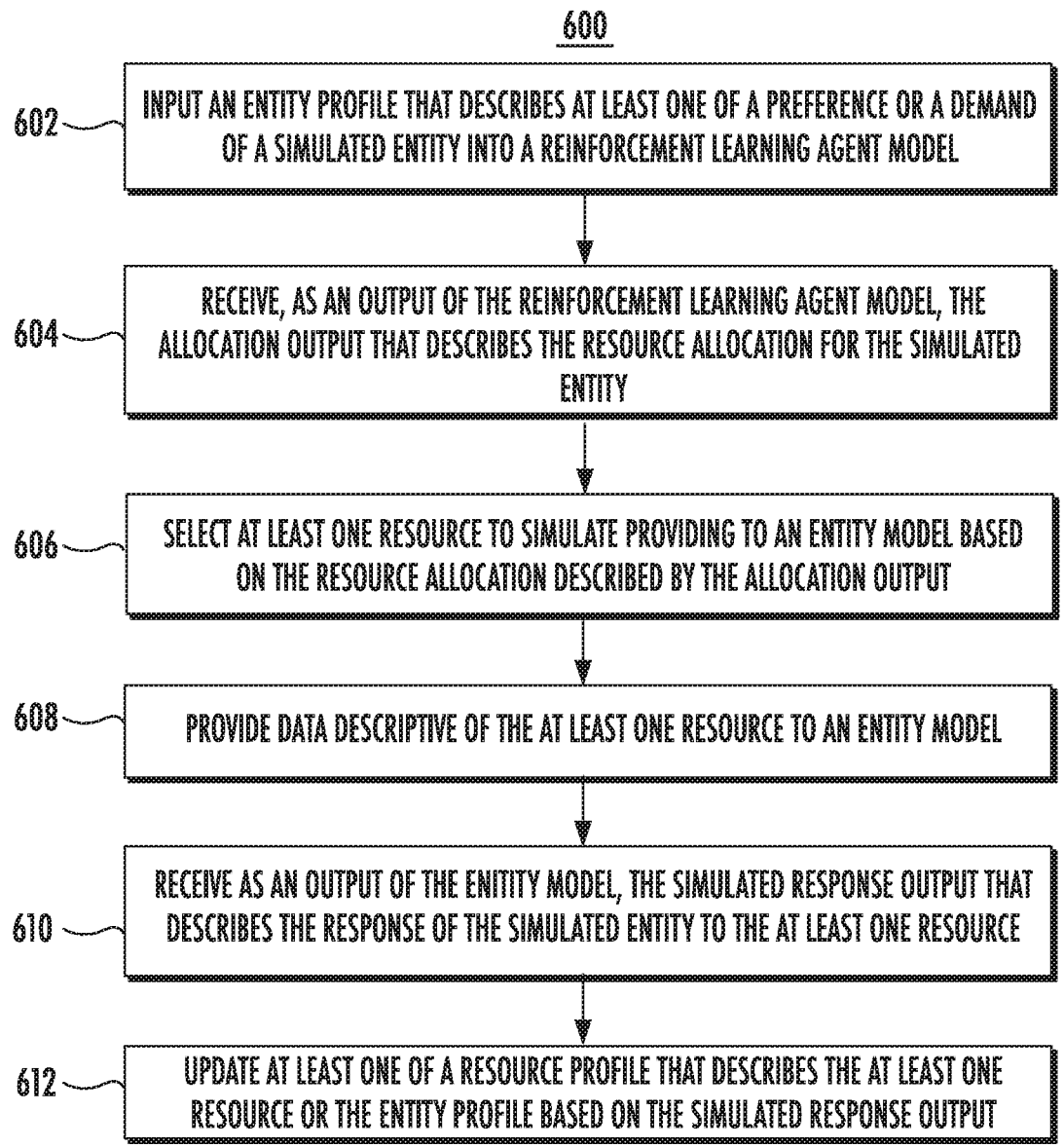
FIG. 6 depicts a flow chart diagram of an example method for simulating allocation of resources to a plurality of entities using a reinforcement learning agent model according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can input an entity profile that describes at least one of a preference or a demand of a simulated entity into a reinforcement learning agent model, for example as described above with reference to FIG. 2 through 5B.

At 604, the computing system can receive, as an output of the reinforcement learning agent model, the allocation output that describes the resource allocation for the simulated entity for example as described above with reference to FIG. 2 through 5B.

At 606, the computing system can select at least one resource to simulate providing to an entity model based on the resource allocation described by the allocation output, for example as described above with reference to FIG. 3 through 5B.

At 608, the computing system can provide data descriptive of the at least one resource to an entity model, for example as described above with reference to FIG. 3 through 5B.

At 610, the computing system can receive, as an output of the entity model, the simulated response output that describes the response of the simulated entity to the at least one resource, for example as described above with reference to FIG. 3 through 5B.

At 612, the computing system can update at least one of a resource profile that describes the at least one resource or the entity profile based on the simulated response output, for example as described above with reference to FIG. 3 through 5B.

Simulation Results

Figure 7A:
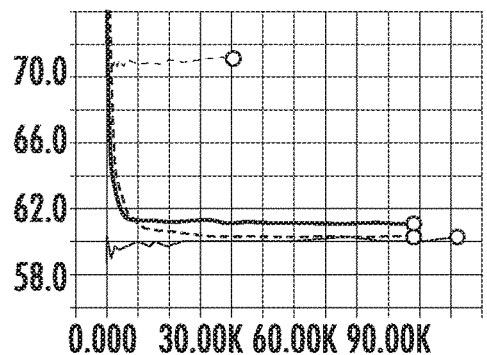
FIGS. 7A through 7C show simulation data for the system of FIG. 5A, including an average episode length, predicted click-through-rates (pCTR), and an average return as a function of training steps for a variety of models.
Figure 7B:
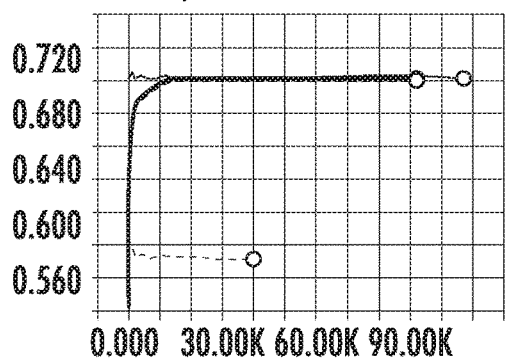
Figure 7C:
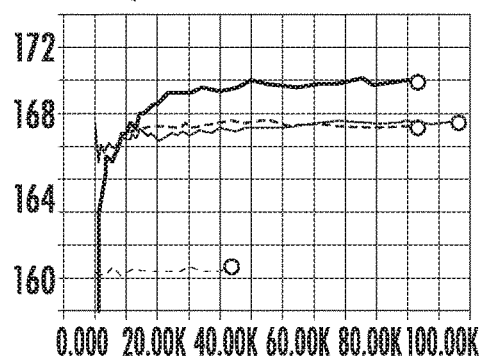

First, we consider the case where the simulated human user follows the multinomial proportion model. This model matches the predicted click-through rate (pCTR) model given to a conditional state deep q network (CSDQN) model. FIGS. 7A, 7B, and 7C show the average episode length, pCTR on slates, and the average return as a function of training steps (not episodes) for each of a CSDQN lifetime value (LTV) model, CSDQN myopic model (gamma=0), a perfect greedy model (always selects top K pCTR items), and a random multinomial proportion model. As the graphs show, the LTV method provides the highest return (2 time units, which is approximately 1% of the budget and a 1.2% increase over myopic/greedy). As expected, the myopic model converges to the same return as the perfect greedy model. The effect on the clusters shown over time suggests that the high degree of stochasticity is the reason for the "small" sized gains.

Figure 8A:
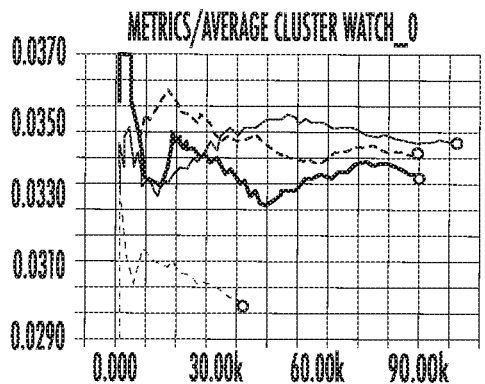
FIGS. 8A through 8U show simulation data for the system of FIG. 5A, including the fraction of times a cluster is watched over time using slates recommended by each of the agents.
Figure 8B:
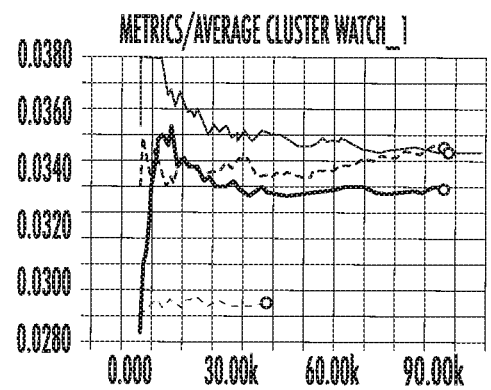
Figure 8C:
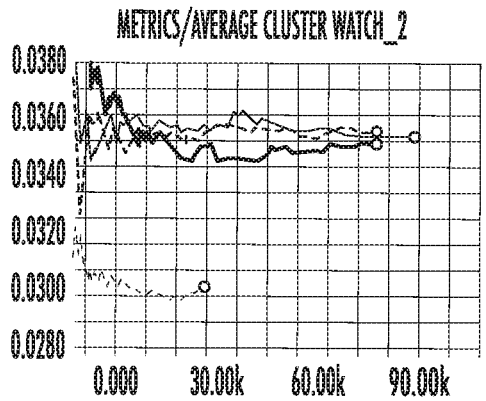
Figure 8D:
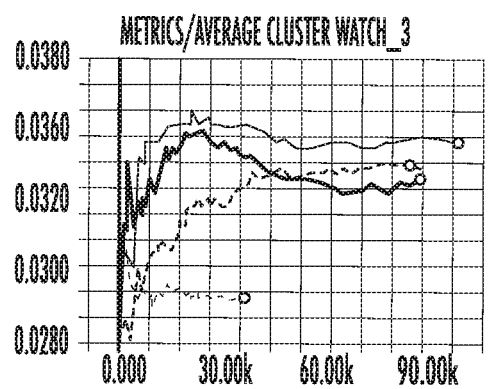
Figure 8E:
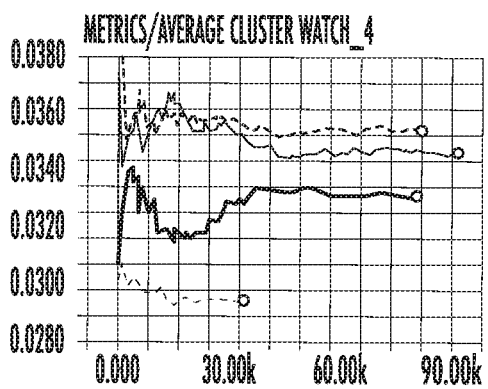
Figure 8F:
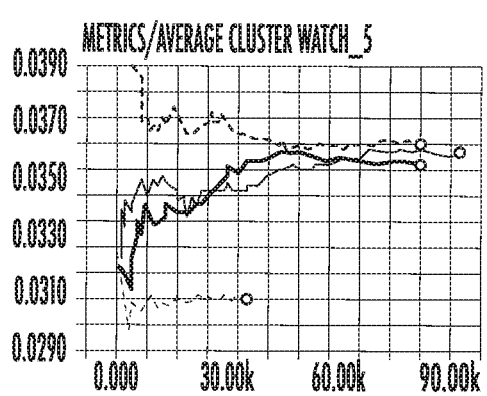
Figure 8G:
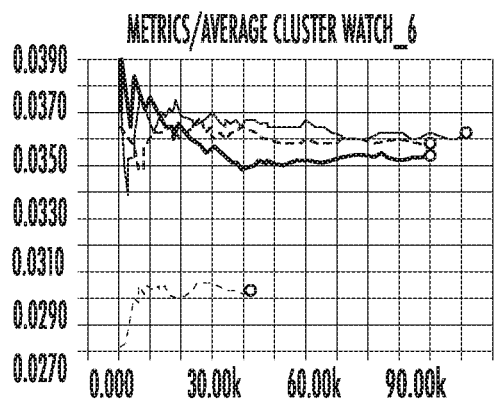
Figure 8H:
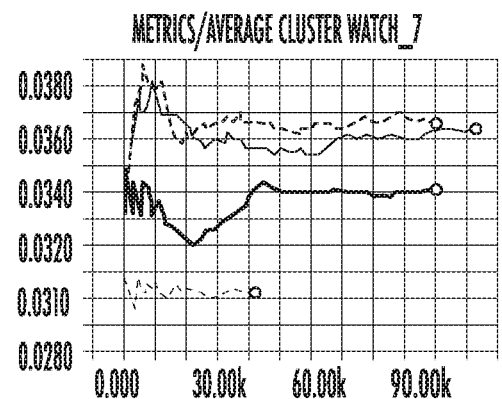
Figure 8I:
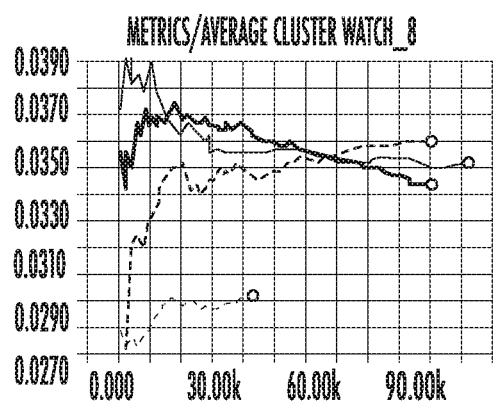
Figure 8J:
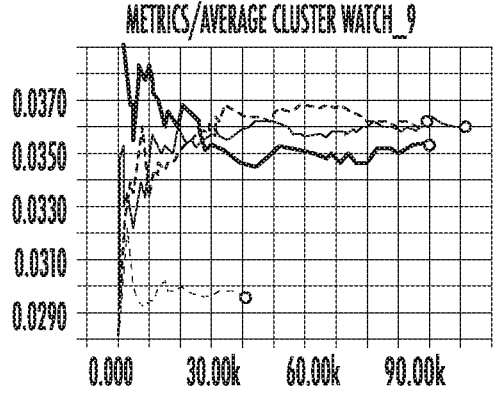
Figure 8K:
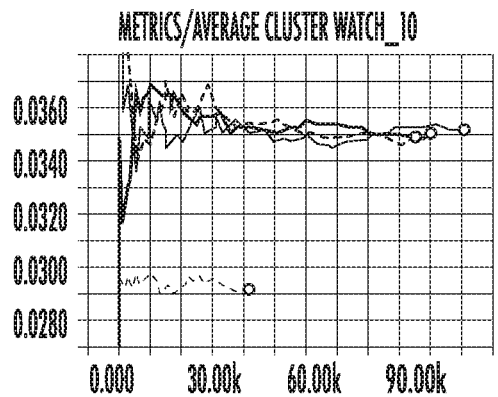
Figure 8L:
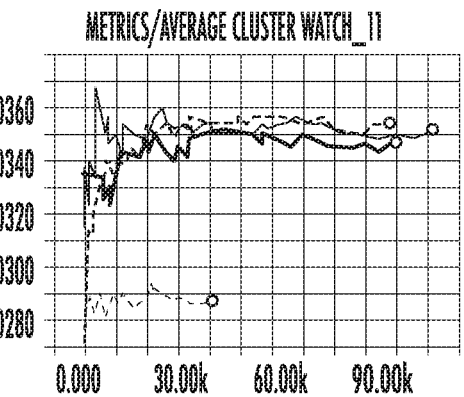
Figure 8M:
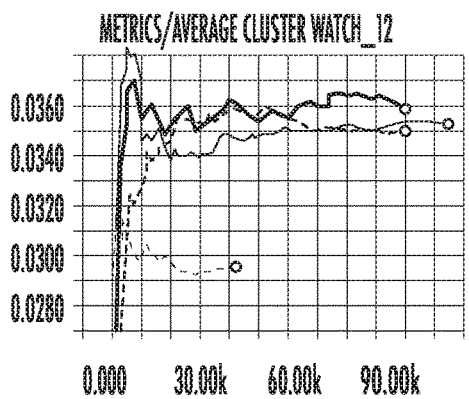
Figure 8N:
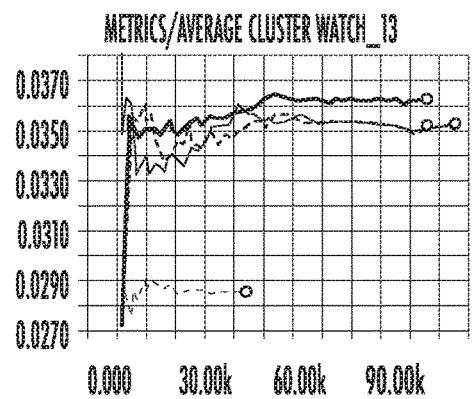
Figure 8O:
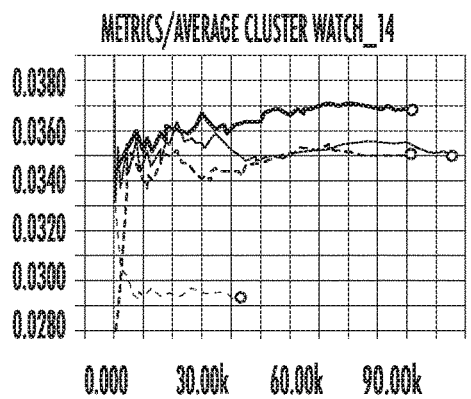
Figure 8P:
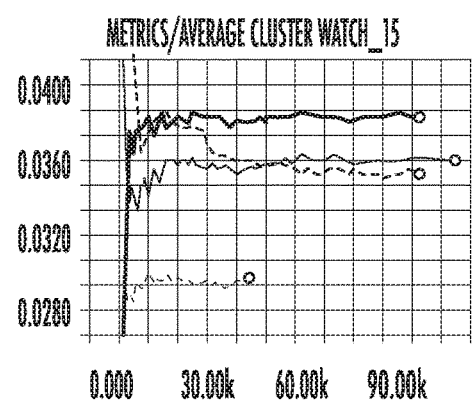
Figure 8Q:
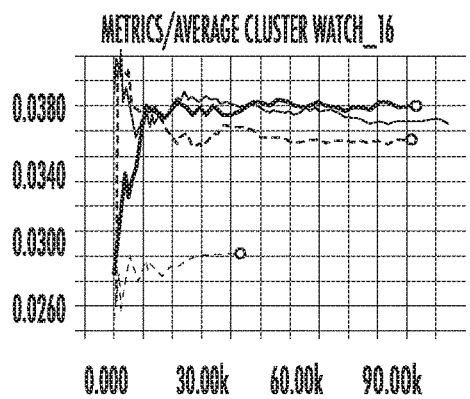
Figure 8R:
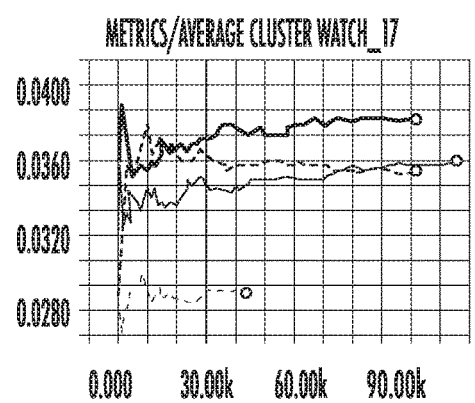
Figure 8S:
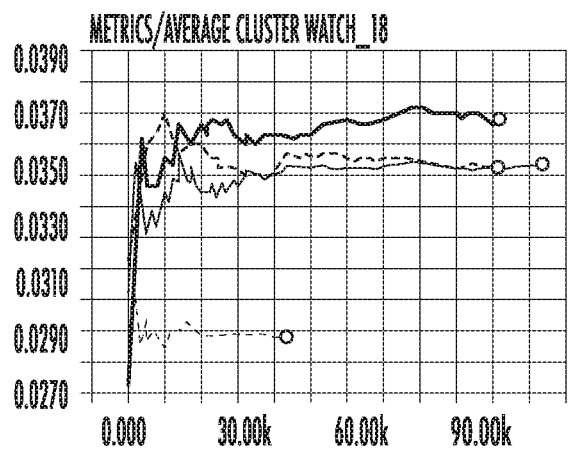
Figure 8T:
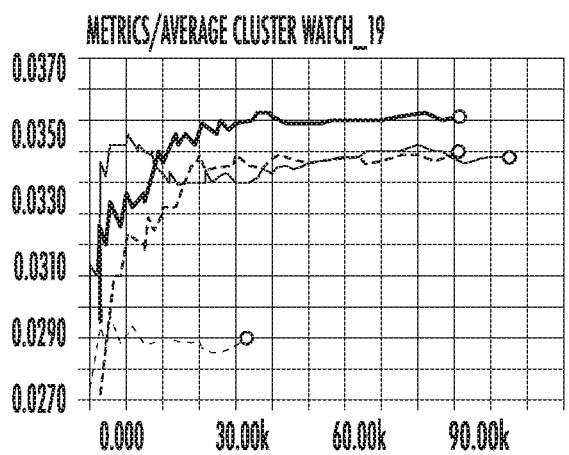
Figure 8U:
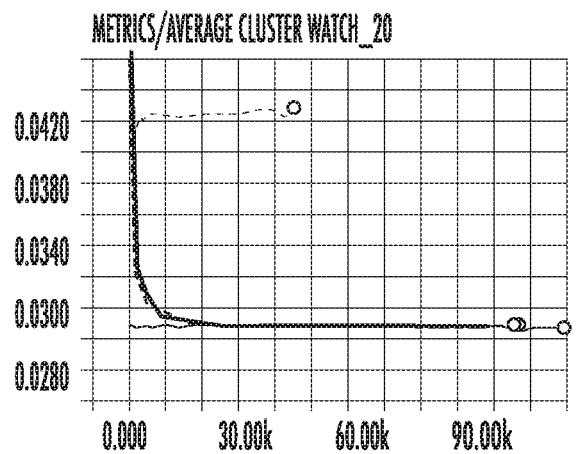

FIGS. 8A through 8U show the fraction of times a cluster is watched over time, using slates recommended by each of the agents. FIGS. 8A through 8M are low quality clusters; FIGS. 8N and 8O are neutral quality; and 8P through 8U are high quality. As the graphs show, the CSDQN LTV model learns to suggest higher quality clusters over time. For the low quality clusters, the CSDQN LTV model is generally below the others, while for the high quality clusters, it is above. It is not always possible to select high quality clusters since there are 20 total clusters, and only 10 are shown at a time. Thus, sometimes the agent must select a low quality cluster. The fraction of times no video was watched is shown in FIG. 8U and labeled "AverageClusterWatch_None." The fraction of watches for the greedy agent over all clusters (except "AverageClusterWatch_None") converge to roughly the same value (~0.035-0.036), which suggests clusters are picked uniformly, since interests of the simulated human users are also distributed uniformly.

Figure 9A:
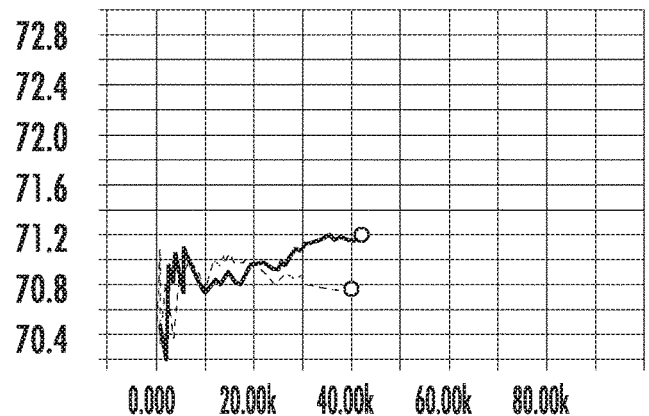
FIGS. 9A through 9C show simulation data for the system of FIG. 5A in which the parameters of the choice model are selected such that a random policy for both the multinomial proportion and exponential cascade models produce similar returns.
Figure 9B:
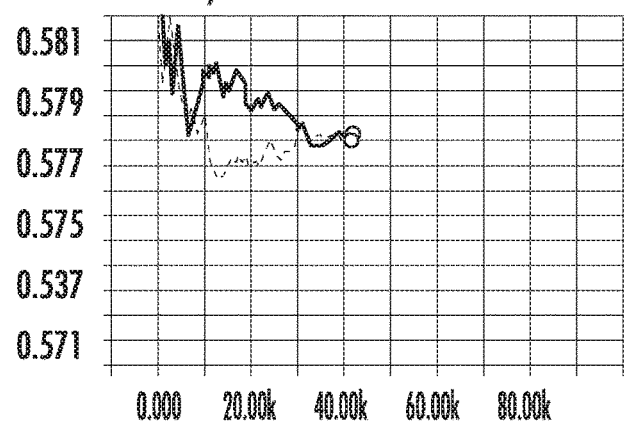
Figure 9C:
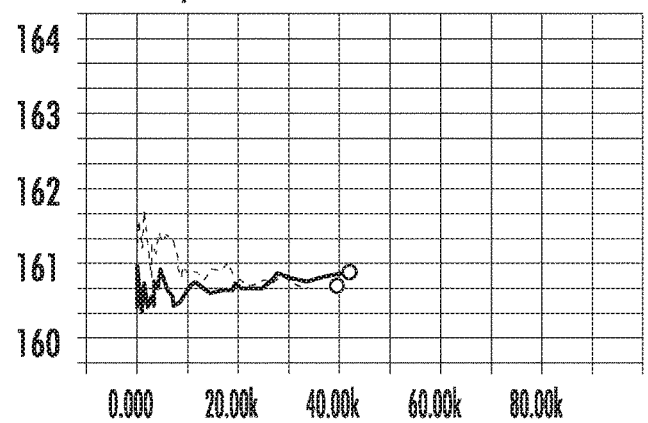

FIGS. 9A through 9C show what happens if the underlying user choice model is different. The CSDQN model assumes user choice is performed with multinomial proportion, but the actual user model is the exponential cascade with multinomial proportion base probabilities. In order to make this experiment comparable to the last one, we tune the parameters of the choice model such that the random policy for both the multinomial proportion and exponential cascade models produce similar returns.

Figure 10A:
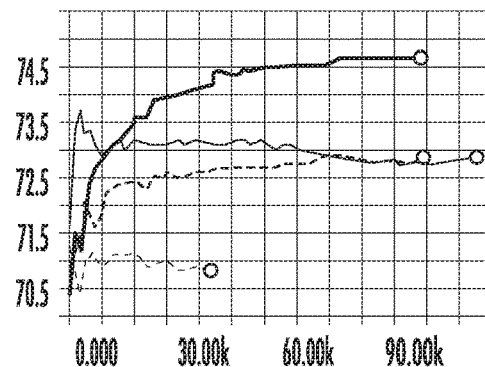
FIGS. 10A through 10C show the results of using a cascade model for user choice and multinomial proportion inside the CSDQN model.
Figure 10B:
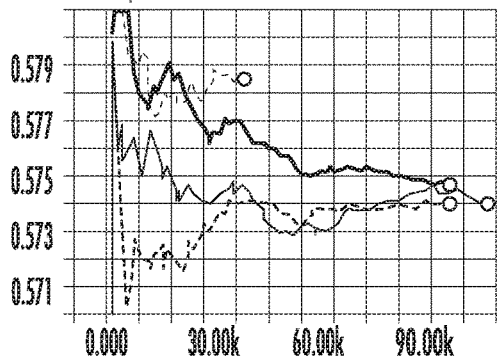
Figure 10C:
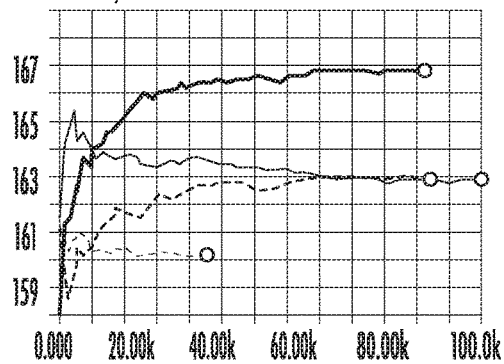
Figure 11A:
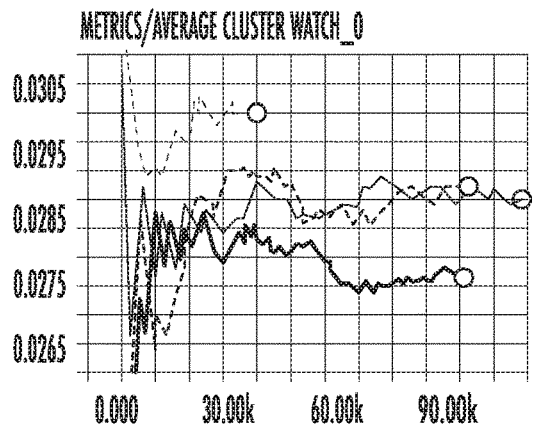
FIGS. 11A through 11U show simulation data for the experiment described above with reference to FIGS. 10A through 10C, including the fraction of times a cluster is watched over time using slates recommended by each of the agents.
Figure 11B:
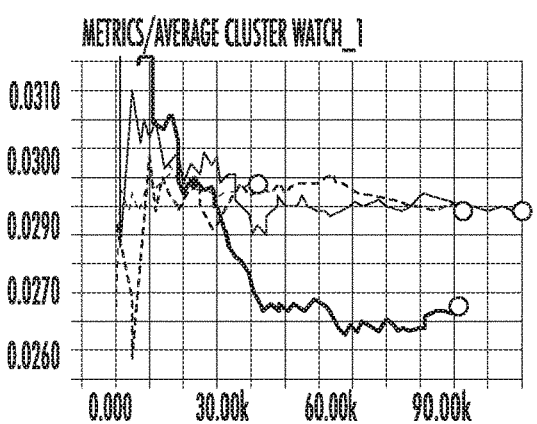
Figure 11C:
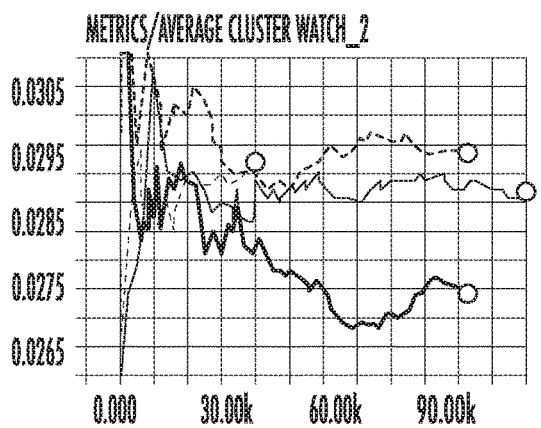
Figure 11D:
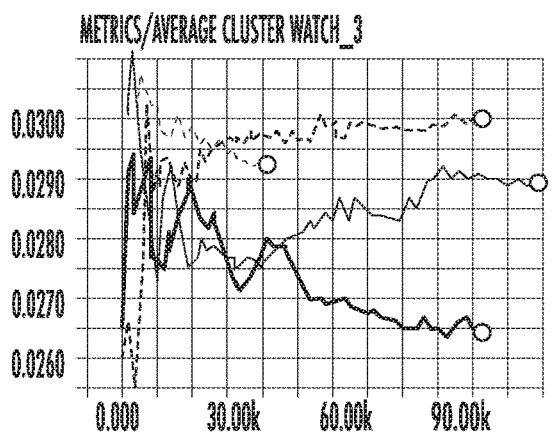
Figure 11E:
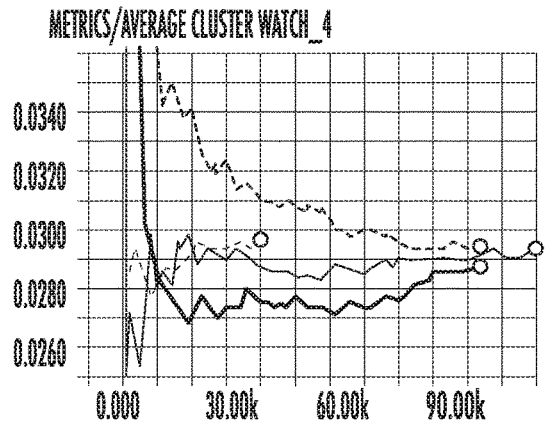
Figure 11F:
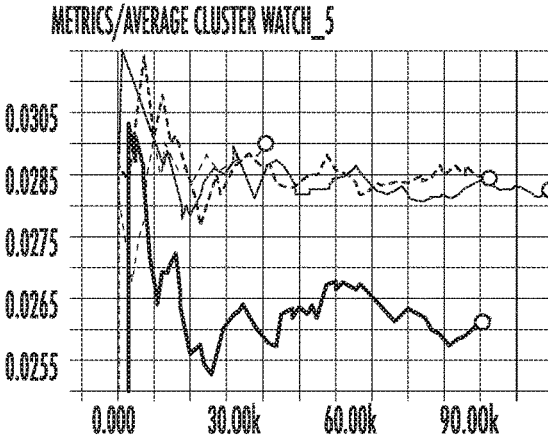
Figure 11G:
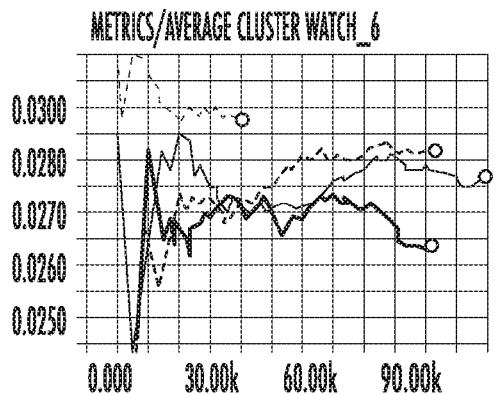
Figure 11H:
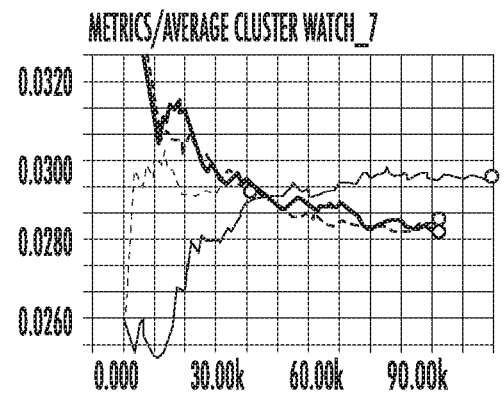
Figure 11I:
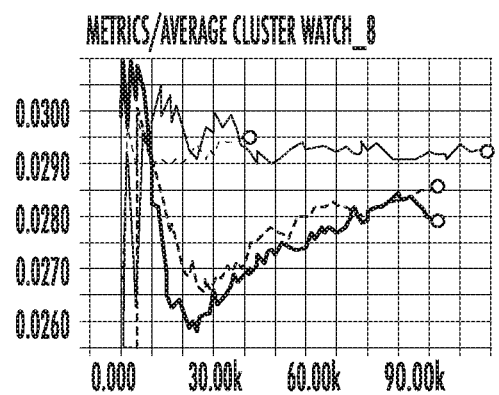
Figure 11J:
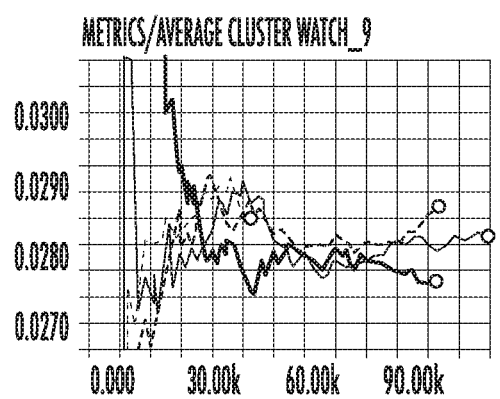
Figure 11K:
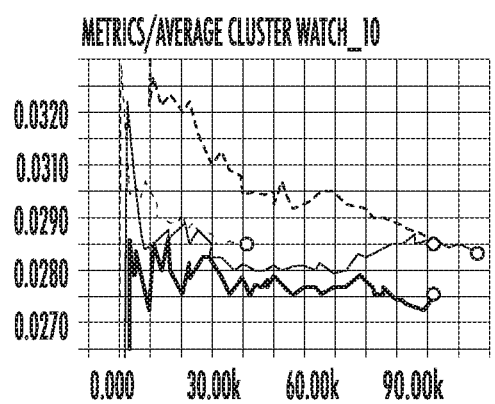
Figure 11L:
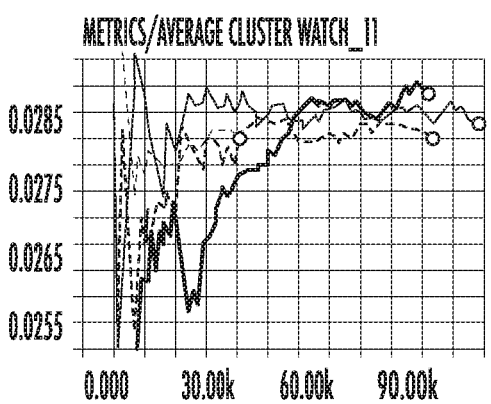
Figure 11M:
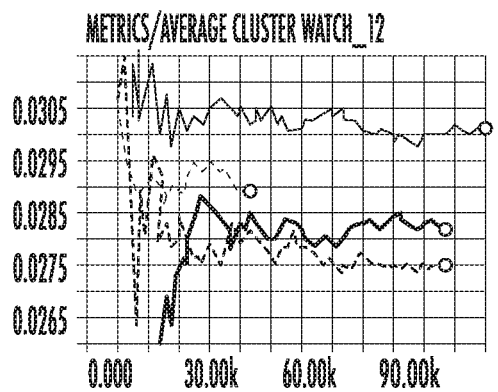
Figure 11N:
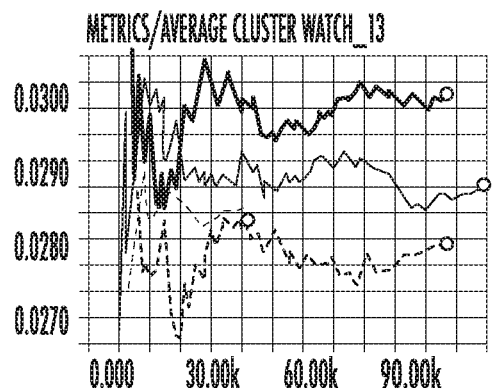
Figure 11O:
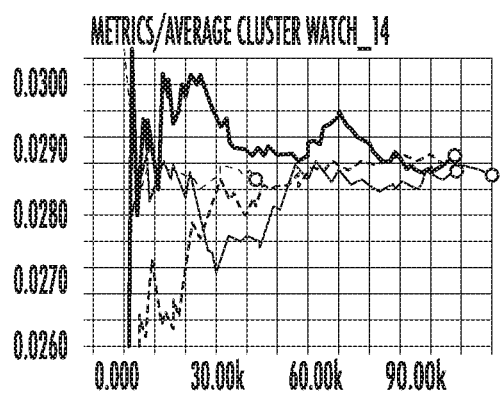
Figure 11P:
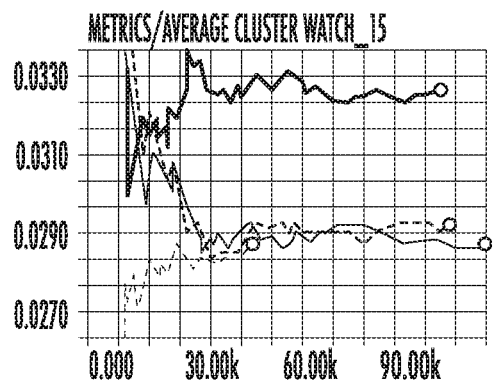
Figure 11Q:
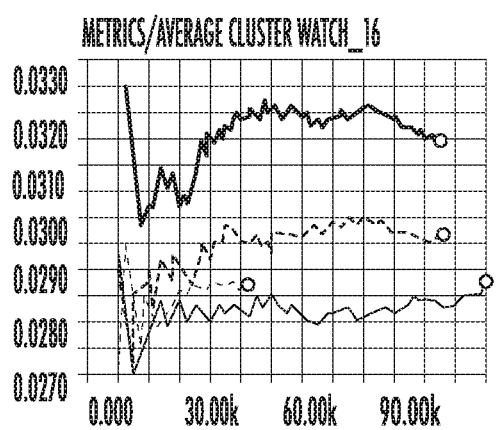
Figure 11R:
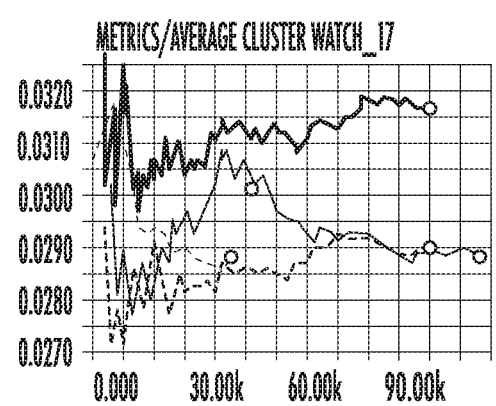
Figure 11S:
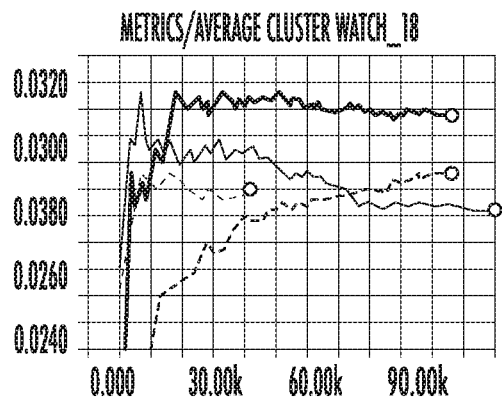
Figure 11T:
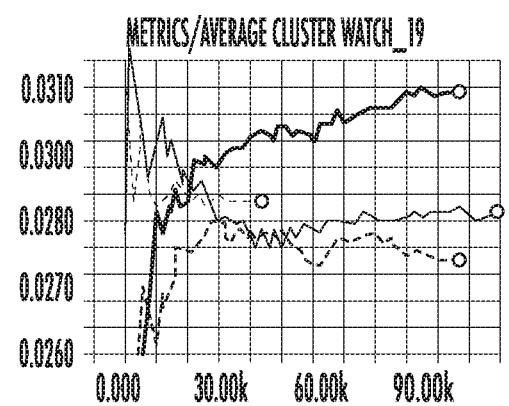
Figure 11U:
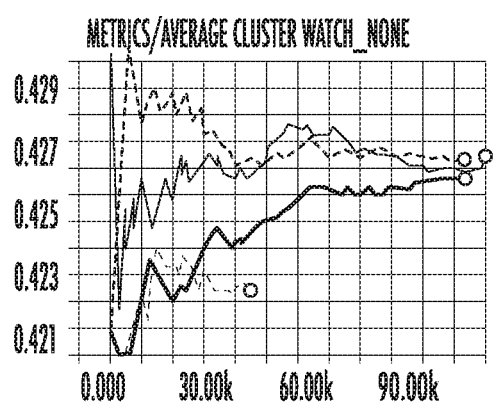

FIGS. 10A through 10C show the results of using the cascade model for user choice and multinomial proportion inside the CSDQN model. With this choice model, there is about a 2 to 2.5% increase in expected watch time. The results show similar effects to the first case. Finally, FIGS. 11A through 11U show the data for the experiment described above with reference to FIGS. 10A through 10C. These graphs were produced with a single run, with 50 evaluations per point. More specifically, FIGS. 11A through 11U show the fraction of times a cluster is watched over time, using slates recommended by each of the agents for the experiment described above with reference to FIG. 10A through 10C. FIGS. 11A through 11M are low quality clusters; FIGS. 11N and 11O are neutral quality; and 11P through 11U are high quality.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for simulating allocation of resources to a plurality of entities, the computing system comprising:
    one or more processors;
    a reinforcement learning agent model configured to receive an entity profile that describes at least one of a preference or a demand of a simulated entity, and in response to receiving the entity profile, output an allocation output that describes a resource allocation for the simulated entity of the plurality of entities;
    an entity model configured to receive data descriptive of at least one resource, and in response to receiving the data descriptive of the at least one resource, simulate a simulated response output that describes a response of the simulated entity to the data descriptive of the at least one resource;
    one or more non-transitory computer-readable media that collectively store instructions that, when executed by the one or more processors, cause the computing system to perform operations, the operations comprising:
        inputting the entity profile into the reinforcement learning agent model;
        receiving, as an output of the reinforcement learning agent model, the allocation output that describes the resource allocation for the simulated entity;
        selecting the at least one resource to provide to the entity model based on the resource allocation described by the allocation output;
        providing the at least one resource to the entity model;
        receiving, as an output of the entity model, the simulated response output that describes the response of the simulated entity to the at least one resource; and
        updating the entity profile based on the simulated response output, wherein a budget feature of the entity profile is updated based on a utility of the at least one resource to the simulated entity.

2. The computing system of claim 1, wherein the resource allocation is based on a comparison of the budget feature and a threshold.

3. The computing system of claim 1, wherein:
    the simulated entity comprises at least one of a computing task or a source of the computing task; and
    the at least one resource comprises a worker configured to execute the computing task.

4. The computing system of claim 1, wherein:
    the simulated entity comprises an industrial process; and
    the at least one resource comprises an input to the industrial process.

5. The computing system of claim 1, wherein the simulated entity comprises a simulated human user, and the entity profile comprises a user profile that describes at least one of interests or preferences of the simulated human user.

6. The computing system of claim 5, wherein the simulated response output describes an engagement metric that describes at least one of an interaction time, a consumption amount, a number of engagements, or a rating of the simulated human user with respect to the at least one resource.

7. The computing system of claim 1, wherein updating at least one of a resource profile or the entity profile based on the simulated response output comprises providing data that describes the simulated response output to a user transition model that generates an updated set of user hidden state features and updating the entity profile based on the user hidden state features.

8. The computing system of claim 1, wherein the at least one resource comprises at least one document that comprises at least one of text, audio, video, or graphical content.

9. The computing system of claim 1, further comprising a resource model configured to receive data descriptive of a plurality of resources including the at least one resource, and in response to receiving the data descriptive of the plurality of resources, output resource observable features, and wherein the reinforcement learning agent model is trained to select the allocation output based, at least in part, on the resource observable features, and wherein the operations further comprise:
inputting the data descriptive of the plurality of resources into the resource model;
receiving, as an output of the resource model, resource observable features; and
inputting the resource observable features into the reinforcement learning agent model.

10. The computing system of claim 1, wherein the utility is based at least in part on a combination of
an alignment of an interest feature of the entity profile and properties of the resource, and
a quality feature of a resource profile that describes the at least one resource.

11. The computing system of claim 10, wherein the entity model comprises a discrete choice model.

12. The computing system of claim 11, wherein the discrete choice model comprises at least one a multinomial proportion function, multinomial logit function, or exponential cascade function.

13. A method for simulating allocation of resources to a plurality of entities, the method comprising:
inputting, by one or more computing devices, an entity profile that describes at least one of a preference or a demand of a simulated entity into a reinforcement learning agent model, the reinforcement learning agent model configured to receive the entity profile, and in response to receiving the entity profile, output an allocation output that describes a resource allocation for the simulated entity;
receiving, by the one or more computing devices, as an output of the reinforcement learning agent model, the allocation output that describes the resource allocation for the simulated entity;
selecting, by the one or more computing devices, at least one resource to simulate providing to an entity model based on the resource allocation described by the allocation output, the entity model being configured to receive data descriptive of the at least one resource, and in response to receiving the data descriptive of the at least one resource, simulate a simulated response output that describes a response of the simulated entity to the data descriptive of the at least one resource;
providing, by the one or more computing devices, data descriptive of the at least one resource to an entity model;
receiving, by the one or more computing devices, as an output of the entity model, the simulated response output that describes the response of the simulated entity to the at least one resource; and
updating, by the one or more computing devices, the entity profile based on the simulated response output, wherein a budget feature of the entity profile is updated based on a utility of the at least one resource to the simulated entity.

14. The method of claim 13, wherein the resource allocation is based on a comparison of the budget feature and a threshold.

15. The method of claim 13, wherein the simulated entity comprises a simulated human user, and the entity profile comprises a user profile that describes at least one of interests or preferences of the simulated human user.

16. The method of claim 15, wherein the simulated response output describes an engagement metric that describes at least one of an interaction time, a consumption amount, a number of engagements, or a rating of the simulated human user with respect to the at least one resource.

17. The method of claim 13, wherein updating, by the one or more computing devices, the entity profile based on the simulated response output comprises:
providing, by the one or more computing devices, data that describes the simulated response output to a user transition model that generates an updated set of user hidden state features and updating, by the one or more computing devices, the entity profile based on the user hidden state features.

18. The method of claim 13, wherein the at least one resource comprises at least one document that comprises at least one of text, audio, video, or graphical content.

19. The method of claim 13, further comprising:
inputting, by the one or more computing devices, the data descriptive of the plurality of resources into a resource model that is configured to receive data descriptive of a plurality of resources including the at least one resource, and in response to receiving the data descriptive of the plurality of resources, output resource observable features;
receiving, by the one or more computing devices, as an output of the resource model, resource observable features; and
inputting, by the one or more computing devices, the resource observable features into the reinforcement learning agent model, wherein the reinforcement learning agent model is trained to select the allocation output based, at least in part, on the resource observable features.

20. The method of claim 13, wherein the utility is based at least in part on a combination of
an alignment of an interest feature of the entity profile and properties of the resource, and
a quality feature of a resource profile that describes the at least one resource.

* * * * *